United States Patent
Kayama

(10) Patent No.: US 7,631,258 B2
(45) Date of Patent: Dec. 8, 2009

(54) INFORMATION PROCESSING APPARATUS AND METHOD ALLOWING FLEXIBLE OUTPUT SETTINGS FOR INDIVIDUAL PIECES OF OUTPUT DATA

(75) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 11/398,439

(22) Filed: Apr. 5, 2006

(65) Prior Publication Data
US 2006/0256360 A1  Nov. 16, 2006

(30) Foreign Application Priority Data
Apr. 7, 2005  (JP)  ............... 2005-111284

(51) Int. Cl.
*G06F 17/00* (2006.01)
(52) U.S. Cl. .............. 715/277; 715/200; 358/1.15
(58) Field of Classification Search ............... 715/200, 715/244, 277; 358/1.15
See application file for complete search history.

(56) References Cited

U.S. PATENT DOCUMENTS

| | | | |
|---|---|---|---|
| 6,498,658 B1 * | 12/2002 | Sekikawa | .............. 358/1.16 |
| 7,092,983 B1 * | 8/2006 | Tyrrell, III | .............. 709/201 |
| 2003/0161670 A1 * | 8/2003 | Watanabe et al. | .............. 400/61 |
| 2003/0208564 A1 * | 11/2003 | Miyake et al. | .............. 709/219 |
| 2003/0208565 A1 * | 11/2003 | Nishihara et al. | .............. 709/219 |
| 2004/0057073 A1 * | 3/2004 | Egawa et al. | .............. 358/1.15 |
| 2004/0190057 A1 * | 9/2004 | Takahashi et al. | .............. 358/1.15 |
| 2004/0257615 A1 * | 12/2004 | Yamamuro | .............. 358/1.15 |
| 2005/0078568 A1 * | 4/2005 | Lee et al. | .............. 369/30.07 |
| 2005/0154747 A1 * | 7/2005 | Kii et al. | .............. 707/101 |
| 2006/0176498 A1 * | 8/2006 | Wada et al. | .............. 358/1.13 |
| 2008/0266594 A1 * | 10/2008 | Lankreijer et al. | .............. 358/1.15 |
| 2009/0030857 A1 * | 1/2009 | Horvitz et al. | .............. 706/12 |

FOREIGN PATENT DOCUMENTS

| | | |
|---|---|---|
| JP | 11-102362 A | 4/1999 |
| JP | 2000-118095 A | 4/2000 |
| JP | 2005-043563 A | 2/2005 |

OTHER PUBLICATIONS

"A workflow RIP corresponding to JDF", Professional DTP, Sep. 1, 2004, Japan, Kohgaku-Sha Co.,Ltd.

* cited by examiner

*Primary Examiner*—Adam M Queler
(74) *Attorney, Agent, or Firm*—Canon U.S.A., Inc. I.P. Division

(57) ABSTRACT

In order to allow flexible output settings for individual pieces of output data, in a hot folder, names relating to pieces of output data (e.g., subfolder names or print data names) and pieces of output setting information are set in association with each other. Thus, a job ticket is generated using a piece of output setting information associated with a name relating to a piece of output data input to the hot folder.

1 Claim, 22 Drawing Sheets

FIG. 11

Setting of subfolder

| Name of subfolder | Type | Print order |
|---|---|---|
| Cover sheet | Cover sheet | |
| Body 1 | Body | 1 |
| Tab sheet 1 | Tab sheet | 2 |
| Body 2 | Body | 3 |
| Tab sheet 2 | Tab sheet | 4 |
| ⋮ | ⋮ | ⋮ |
| Tab sheet N | Tab sheet | N-1 |
| Body N | Body | N |

| Add | Edit | Delete | Print setting |
|---|---|---|---|
| 1101 | 1102 | 1103 | 1104 |

1100

400
INFORMATION PROCESSING APPARATUS AND METHOD ALLOWING FLEXIBLE OUTPUT SETTINGS FOR INDIVIDUAL PIECES OF OUTPUT DATA

BACKGROUND OF THE INVENTION

1. Field of the Invention

The present invention relates to information processing apparatuses and methods. More specifically, the present invention relates to an information processing apparatus, and information processing method, and a program for executing the information processing method.

2. Description of the Related Art

In a type of printing system that has been proposed, when print data is transmitted from a server or a client to a printing apparatus, in order to simplify routine tasks, print data is input to a hot folder. A hot folder refers to a folder for which print-setting information, such as page layout and print-sheet size, is set in advance. For example, a file that serves as print data is saved in the hot folder by a drag-and-drop operation. When a monitoring program detects the input of the print data, a job for the print data is automatically registered. In this application, a hot folder is sometimes also referred to as a control folder.

Furthermore, according to Japanese Patent Laid-Open No. 2000-118095, it is possible to set a rule as to which printing machine is to be used according to the data format of document data input to a hot folder, and also to set a rule as to whether the document data is to be printed immediately or to be registered as a job. Furthermore, according to the description, it is possible to set a plurality of rules for a single hot folder.

According to the techniques described in Japanese Patent Laid-Open No. 2000-118095, it is possible to change the output device used according to the data formats of individual pieces of document data input to a hot folder. However, it is not possible to vary the output format of printed materials among the individual pieces of document data. That is, according to Japanese Patent Laid-Open No. 2000-118095, when a plurality of pieces of document data of the same data format are input to a hot folder, it is not possible to set print settings so that the individual pieces of document data are output in different formats. For example, when a plurality of pieces of print data are merged and bound into a single book, a certain piece of data is printed as a cover sheet, and another certain piece of print data is printed as Chapter 1 of the body. Also, it is possible that some pieces of print data are printed to tab sheets. When a plurality of pieces of print data are used to yield an output as described above, it is expected that in addition to varying the layout or the order of printing among the individual pieces of print data, the type of sheet or the orientation of printing is varied so that various types of output can be obtained.

According to the techniques described in Japanese Patent Laid-Open No. 2000-118095, it is possible to save the entire data of a single document and to register the entire data as a single job. However, it is not possible to vary the output format among individual pieces of document data. Thus, in order to yield various types of output as described above, it is needed to create hot folders for the individual output formats. This is not efficient from the perspective of user operations.

SUMMARY OF THE INVENTION

The present invention provides an information processing apparatus and method that allow flexible output settings for individual pieces of output data.

According to an aspect of the present invention, there is provided an information processing apparatus having a control folder to which a plurality of pieces of output setting information are set. The information processing apparatus includes an output setting information setting unit configured to set output setting information that is associated with a name relating to the output data; a monitoring unit configured to monitor input of a folder to the control folder; an associating unit configured to associate the output data in the folder monitored by the monitoring unit with output setting information set by the output setting information setting unit based on the name relating to the output data; and an output unit configured to perform an output process using the output setting information and the output data associated by the associating unit.

According to another aspect of the present invention, there is provided an information processing apparatus having a control folder to which a plurality of pieces of output setting information are set. The information processing apparatus includes an output setting information setting unit configured to create subfolders in the control folder and to set pieces of output setting information that is used for outputting output data in the individual subfolders created; a monitoring unit configured to monitor input of output data to the subfolders in the control folder; an associating unit configured to associate the output data in the subfolders in the control folder monitored by the monitoring unit with the output setting information of the individual subfolders set by the output setting information setting unit; and an output unit configured to perform an output process using the output setting information and the output data associated by the associating unit.

According to another aspect of the present invention, there is provided an information processing apparatus having a control folder to which a plurality of pieces of output setting information are set. The information processing apparatus includes an output setting information setting unit configured to set pieces of output setting information that are associated with layers of individual subfolders in a folder that is inputted to the control folder; a monitoring unit configured to monitor input of a folder to the control folder; an associating unit configured to associate the output data in the folder monitored by the monitoring unit with output setting information set by the output setting information setting unit based on layer information; and an output unit configured to perform an output process using the output setting information and the output data associated by the associating unit.

According to another aspect of the present invention, there is provided an information processing method for an information processing apparatus having a control folder to which a plurality of pieces of output setting information are set. The information processing method includes an output setting information setting step of setting output setting information that is associated with a name relating to the output data; a monitoring step of monitoring input of a folder to the control folder; an associating step of associating the output data in the folder monitored by the monitoring step with output setting information set by the output setting information setting step based on the name relating to the output data; and an output step of performing an output process using the output setting information and the output data associated by the associating step.

According to another embodiment of the present invention, there is provided an information processing method for an information processing apparatus having a control folder to which a plurality of pieces of output setting information are set. The information processing method includes an output setting information setting step of creating subfolders in the control folder and setting pieces of output setting information that is used for outputting output data in the individual subfolders created; a monitoring step of monitoring input of output data to the subfolders in the control folder; an associating step of associating the output data in the subfolders in the control folder monitored by the monitoring step with the output setting information of the individual subfolders set by the output information setting step; and an output step of performing an output process using the output setting information and the output data associated by the associating step.

According to another aspect of the present invention, there is provided an information processing method for an information processing apparatus having a control folder to which a plurality of pieces of output setting information are set. The information processing method includes an output setting information setting step of setting pieces of output setting information that are associated with layers of individual subfolders in a folder that is inputted to the control folder; a monitoring step of monitoring input of a folder to the control folder; an associating step of associating the output data in the folder monitored by the monitoring step with output setting information set by the output setting information setting step based on layer information, and an output step of performing an output process using the output setting information and the output data associate by the associating step.

Thus, according to a first embodiment of the present invention, when a folder having a plurality of subfolders including print data is input to a hot folder, it is possible to set different output settings for the individual subfolders of the folder.

Further, according to a second embodiment of the present invention, subfolders are created in advance in a hot folder, and when print data is input to the subfolders, it is possible to yield outputs reflecting output settings set for the individual subfolders.

Moreover, according to a third embodiment of the present invention, when a folder having a plurality of subfolders including print data is input to a hot folder, it is possible to set output settings for the individual subfolders of the folder in association with layers of the subfolders. This serves to improve the efficiency of user operations.

As described above, the aforementioned embodiments are effective in cases where output settings (e.g., print-sheet size) of certain pages or chapters differ among pieces of print data, for example, when a plurality of pieces of print data are bound into a single book. Furthermore, it is possible to set different output settings for individual pieces of output data input to a hot folder without increasing the user's burden.

Further features of the present invention will become apparent from the following description of exemplary embodiments with reference to the attached drawings.

BRIEF DESCRIPTION OF THE DRAWINGS

FIG. 11 is an illustration showing a user interface for setting of a subfolder in an embodiment of the present invention.

DESCRIPTION OF THE EMBODIMENTS

Figure 1:
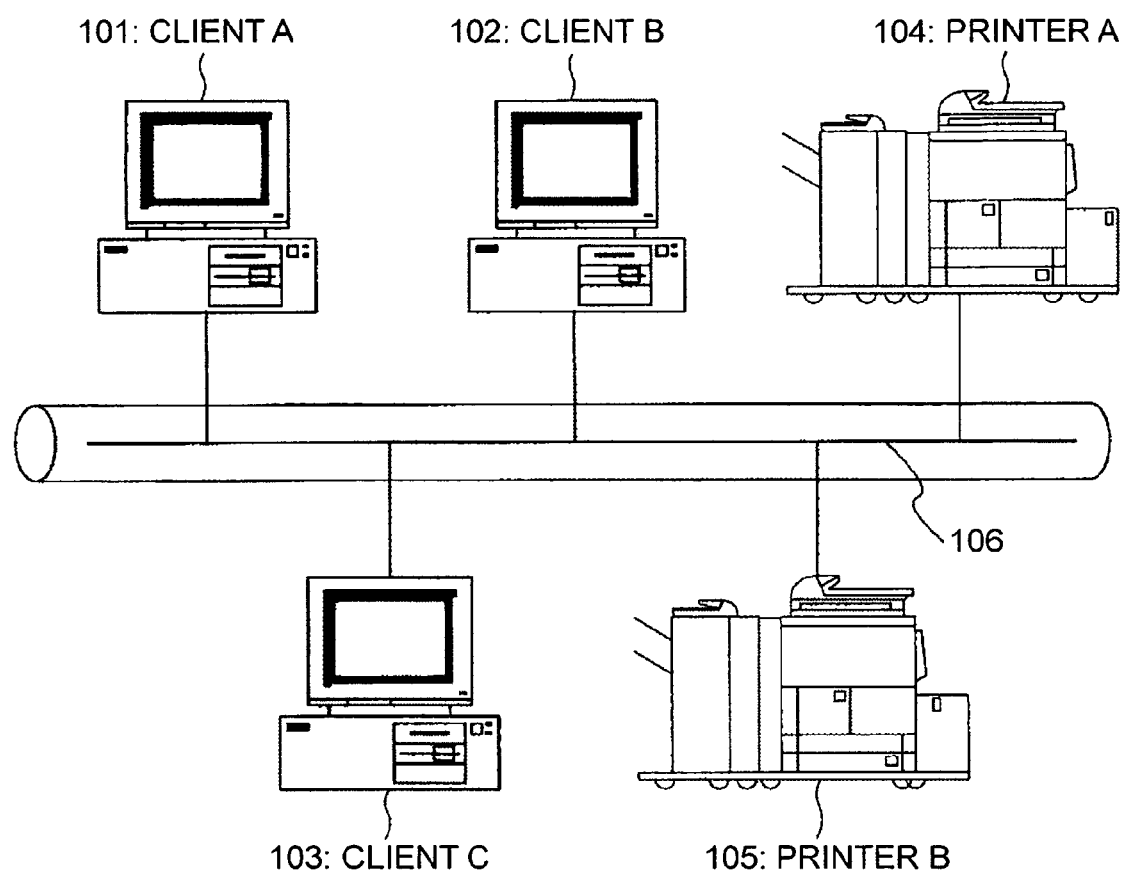
FIG. 1 is a diagram showing the configuration of a print processing system in an embodiment of the present invention.

Now, embodiments of the present invention will be described in detail with reference to the drawings. In the drawings referred to in this specification, parts having similar functions are designated by the same signs.

First Exemplary Embodiment

[Exemplary Configuration of Apparatus]

FIG. 1 is a diagram showing the overall configuration of a print processing system according to a first embodiment of the present invention. The environment of the overall print processing system is given herein only to facilitate understanding of the description of the first embodiment, and the present invention is not limited to implementations under this environment. The present invention is directed to setting different pieces of output information for individual pieces of output data that are input (imported) to a hot folder. For the purpose of specific description, description will be given below in the context of an example of printing as a type of output.

Referring to FIG. 1, client computers 101, 102, and 103 are connected to a network 106 so that these computers can communicate with each other. Typically, the client computers 101, 102, and 103 are personal computers (PCs). Alternatively, print serves can be used in place of the client computers 101, 102, and 103. Each of the PCs 101 to 103 is connected to the network 106 via a network cable, such as an Ethernet® cable. Each of the PCs 101 to 103 is capable of executing various programs, such as application programs, and transferring print data to network printers 104 and 105.

The network printers 104 and 105 act as print controlling devices. The network printers 104 and 105 are connected to the network 106 via network interfaces (not shown). The network printers 104 and 105 analyze print jobs including print data transmitted from client computers, convert the print data into dot images on a page-by-page basis, and prints the dot images. The functions of the network printers 104 and 105 can differ from each other.

The network 106 interconnects the computers 101 to 103, the network printers 104 and 105, and so forth.

Figure 2:
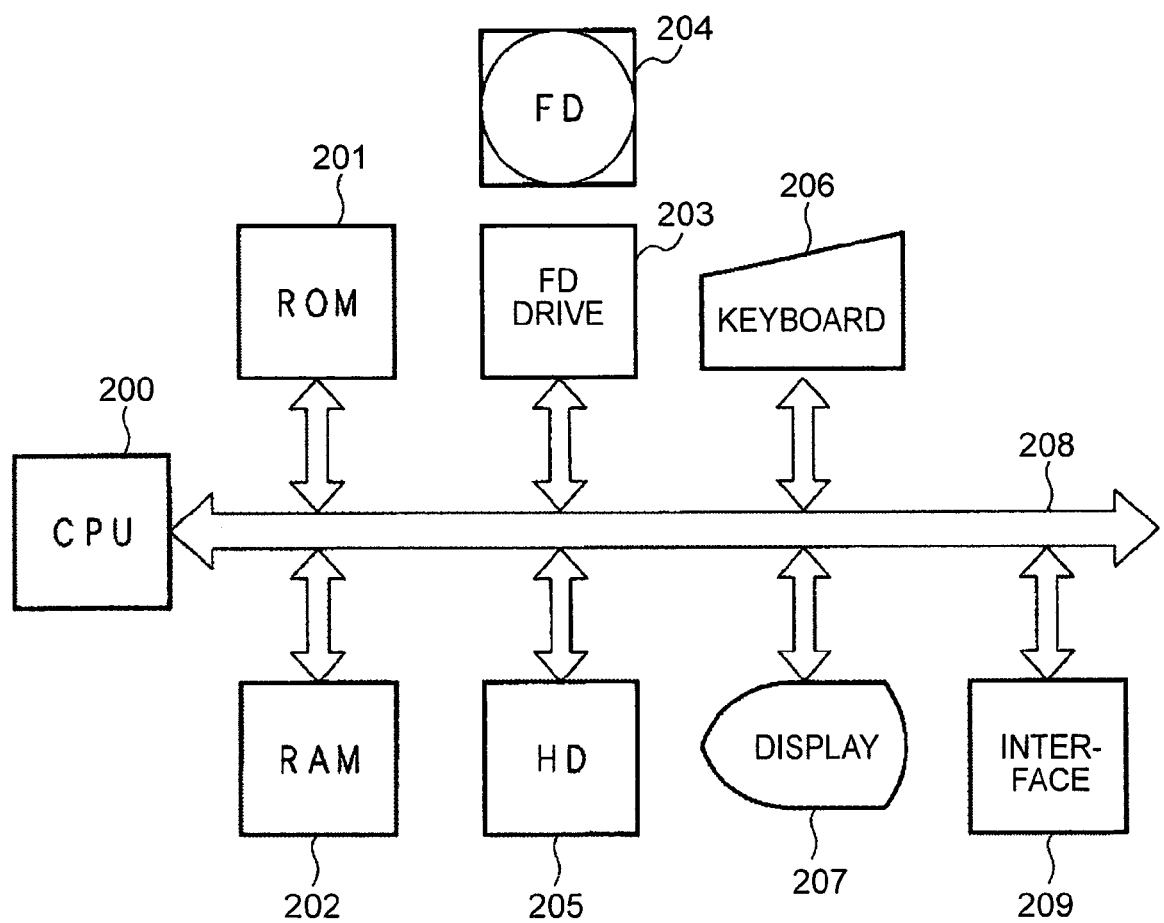
FIG. 2 is a block diagram schematically showing the configuration of a client computer in an embodiment of the present invention.

FIG. 2 is a block diagram showing the configuration of the computers 101 to 103. Referring to FIG. 2, a central processing unit (CPU) 200 exercises overall control of an apparatus. The CPU 200 executes application programs, printer driver programs, an operating system (OS), a printer controlling program according to this embodiment, and so forth, stored in a hard disk (HD) 205, and exercises control so that files or other information needed for the execution of the programs are temporarily stored in a random access memory (RAM) 202.

A read-only memory (ROM) 201 functions as a storage device. The ROM 201 internally stores programs, such as a basic input/output system (BIOS) program, and various types of data used for document processing, such as font data and template data. The RAM 202 allows temporary storage so that it functions as a main memory, a work area, or the like for the CPU 200.

A floppy disk (FD) drive functions as a storage-medium reader. The FD drive allows, for example, loading a program stored on an FD as a storage medium to a computer as described later with reference to FIG. 5. The FD 204 is a storage medium storing a program in a computer-readable form. Without limitation to an FD, other storage media can be used, such as a compact disk read-only memory (CD-ROM), a CD recordable (CD-R), a CD rewritable (CD-RW), a personal computer (PC) card, a digital versatile disk (DVD), an integrated circuit (IC) memory card, a magneto-optical (MO) disk, or a memory stick.

An external storage device 205 is, for example, a hard disk (HD) that serves as a large-capacity memory. The external storage device 205 stores application programs, printer-driver programs, an operating system, control programs, related programs, and so forth.

A keyboard 206 functions as an instruction input device. The keyboard 206 is used by a user to input device controlling commands or the like to a client computer, and also by an operator or an administrator to input device controlling commands or the like to a print server. A display 207 displays commands input from the keyboard 206, the status of a printer, and so forth.

A system bus 208 allows exchanging data within the computer. An input/output interface 209 allows the information processing apparatus to exchange data with external devices.

The configuration of the computer described above is only an example, and the configuration of a computer is not limited to the example shown in FIG. 2. For example, data or programs can be stored in a ROM, a RAM, or an HD depending on the nature of the data or programs.

Figure 3:
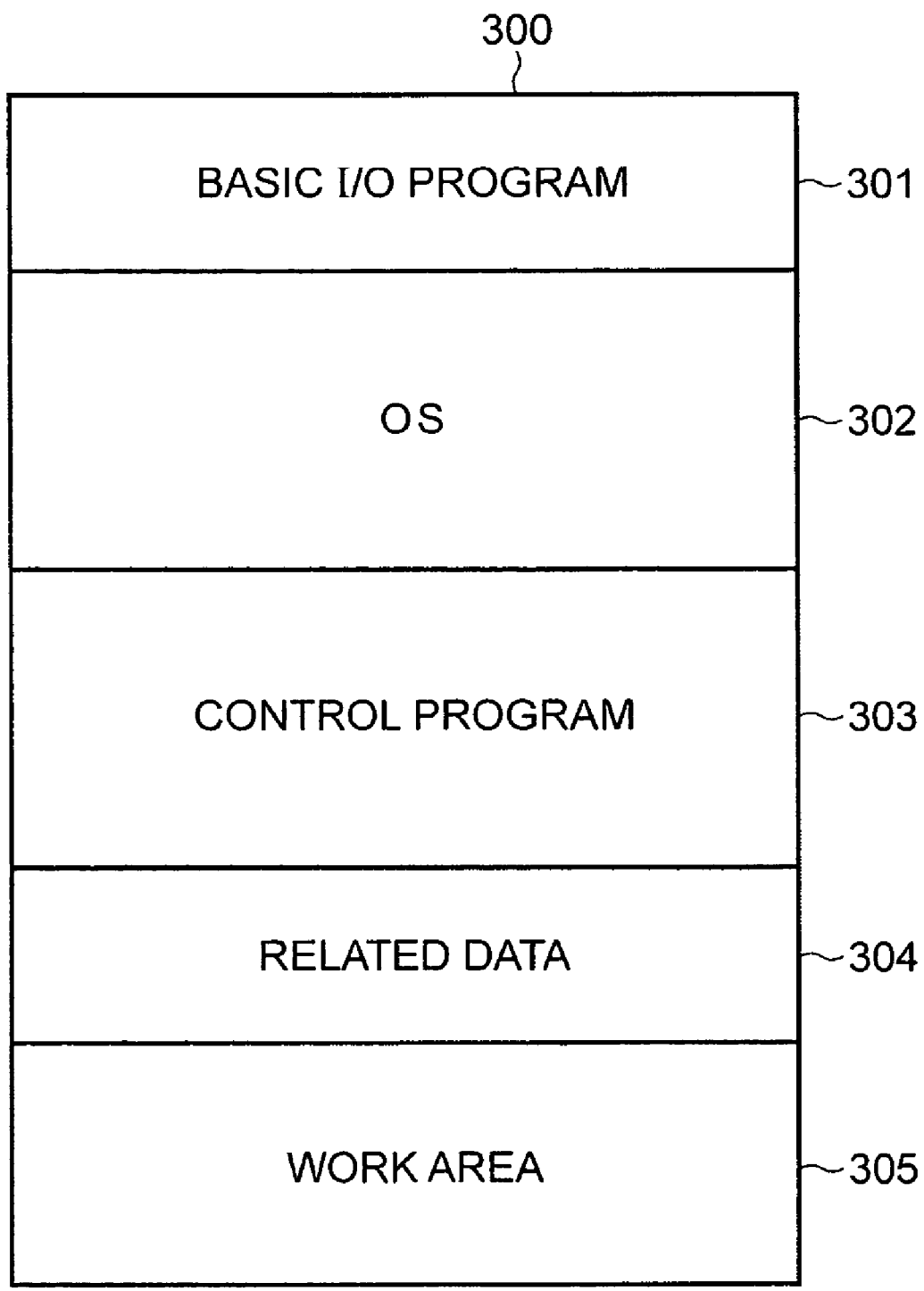
FIG. 3 shows a memory map in a case where a program is loaded from a floppy disk (FD) shown in FIG. 4 to a random access memory (RAM) shown in FIG. 2 in an embodiment of the present invention.

FIG. 3 is a diagram showing an example of a memory map of the RAM 202 shown in FIG. 2. In the memory map shown in FIG. 3, a control programs according to the first embodiment has been loaded from the FD 204 to the RAM 202 so that the control program can be executed.

Although the first embodiment will be described in the context of an example where the control program and related data are loaded directly from the FD 204 to the RAM 202, alternatively, the control program and related data can be loaded to the RAM 202 from the HD 205 having the control program installed thereon each time the control program is invoked. Furthermore, the medium storing the control program can be, for example, a CD-ROM, a CD-R, a PC card, a DVD, or an IC memory card instead of an FD. Also, it is possible to store the control program in the ROM 201 so that the control program constitutes a part of the memory map and to execute the control program directly by the CPU 200. Furthermore, instead of hardware implementation, the implementation can be based on software having functions equivalent to the functions of the devices described above.

A BIOS (basic input/output system) program 301 has an initial program loading (IPL) function that allows reading an operating system (OS) 302 from the HD 205 into the RAM 202 and starting the operation of the OS 302 when the computer is powered on. A control program 303 is stored in an area allocated in the RAM 202. Related data 304 is stored in an area allocated in the RAM 202. A work area 305 is allocated for the execution of the control program 303 by the CPU 200.

Figure 4:
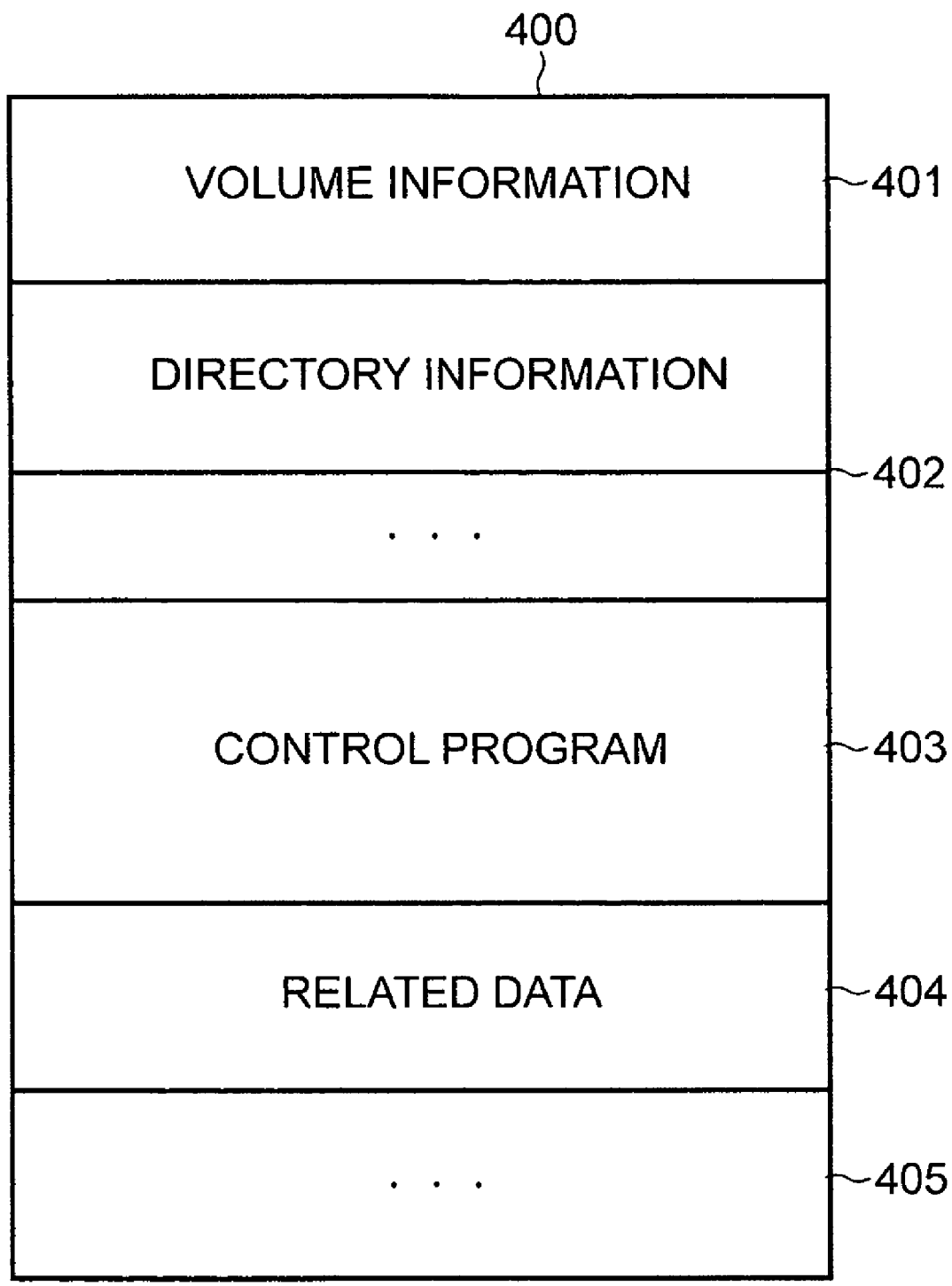
FIG. 4 shows a memory map representing data in an FD shown in FIG. 2 in an embodiment of the present invention.

FIG. 4 is a diagram showing an example of a memory map of the FD 204 shown in FIG. 2. The memory map shown in FIG. 4 includes volume information 401 representing information of data, directory information 402, a control program 403 according to the first embodiment, and related data 404. The control program 403 is a program based on a flowchart according to the first embodiment. In the first embodiment, a client and a server have the same configuration.

Figure 5:
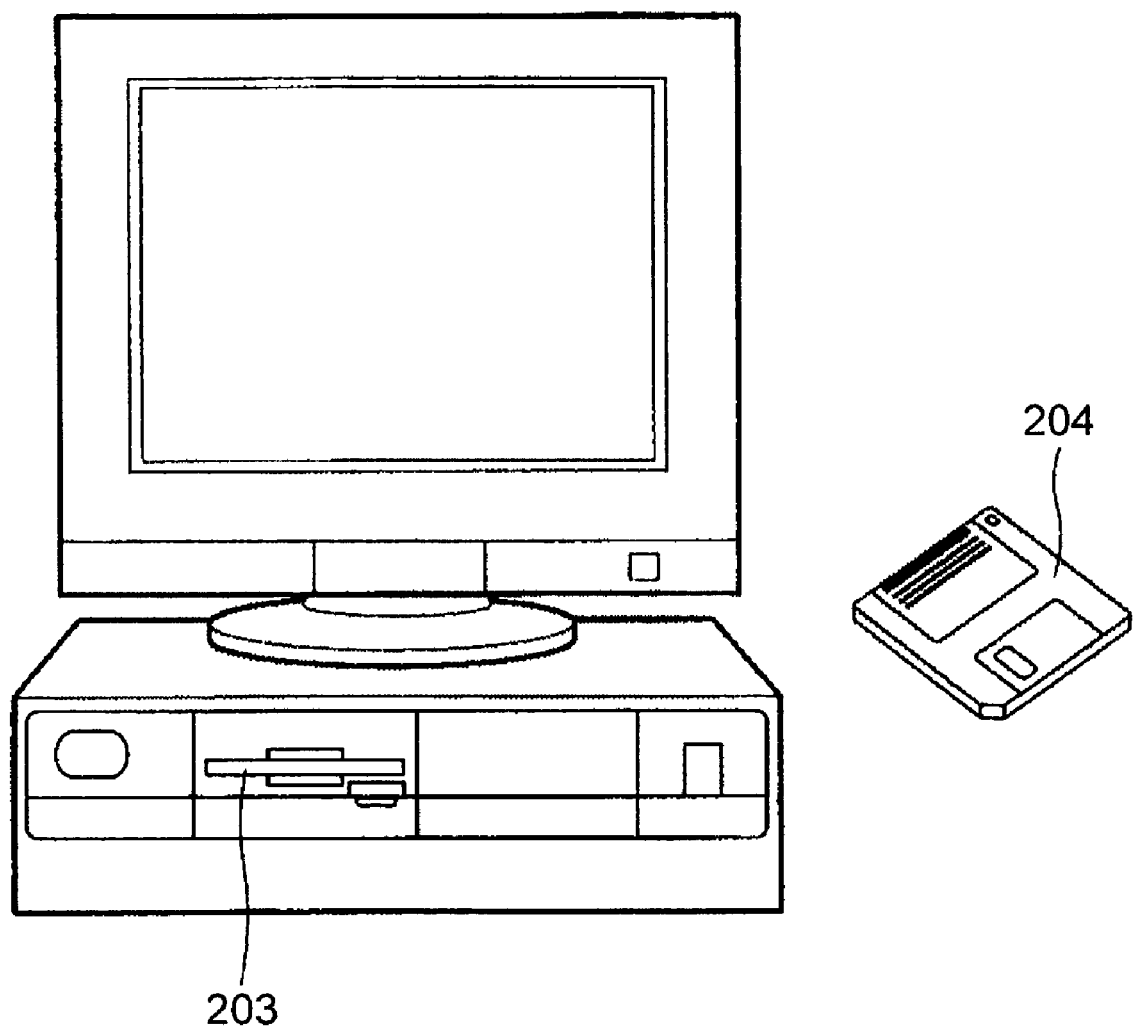
FIG. 5 is a diagram showing a relationship with an FD that is loaded on an FD drive in an embodiment of the present invention.

FIG. 5 is a diagram showing a relationship with the FD 204 loaded on the FD drive 203 shown in FIG. 2, and parts corresponding to those shown in FIG. 2 are designated by the same signs. Referring to FIG. 5, in the FD 204, a control program and related data according to the first embodiment are stored.

Figure 6:
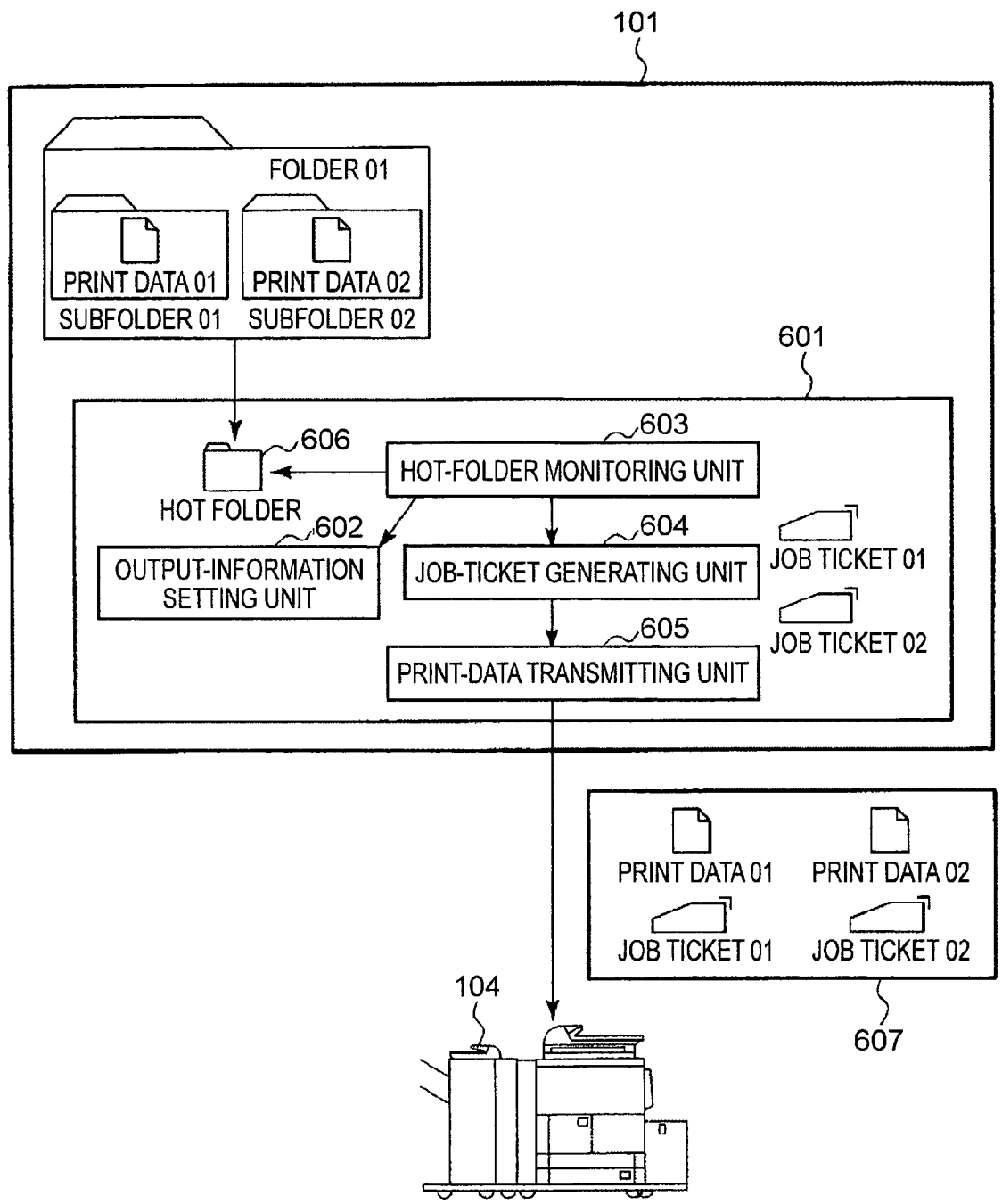
FIG. 6 is a diagram showing an example software configuration of a print system in an embodiment of the present invention.

FIG. 6 is a diagram showing function modules in the software configuration of a print system 601 according to the first embodiment. The print system 601 processes print data or print data in a folder input to a hot folder 606 of the client 101 (in FIG. 6, print data 01 and print data 02 included in subfolders 01 and 02 of a folder 01).

An output-information setting unit 602 is used for setting of a monitoring interval of a hot folder, print setting of input print data, setting of subfolders included in a folder, print setting of each subfolder, and so forth. The output-information setting unit 602 displays operation screens described later with reference to FIGS. 10 to 13. The print setting is managed in the RAM 202 or the HD 205 of the client 101 in association with a folder name or a subfolder name.

A hot-holder monitoring unit 603 monitors input of print data or a folder at a predetermined interval. More specifically, the hot-folder monitoring unit 603 monitors whether print data or a folder including print data has been saved in a memory area corresponding to the hot folder, thereby monitoring data input to the hot folder. "Input" herein refers to importing print data, a folder including print data, or the like to the hot folder by a drag and drop operation or the like. The imported print data is saved in the storage area corresponding to the hot folder.

A job-ticket generating unit 604 generates job tickets for pieces of print data input to the hot folder, including print settings determined by the output-information setting unit 602. In the example shown in FIG. 6, job tickets 01 and 02 are generated for pieces of pieces of print data 01 and 02 included in subfolders 01 and 02 of a folder 01 input to the hot folder. A job ticket herein includes print-setting information for defining an output format, so that a job ticket is also referred to as setting information.

A print-data transmitting unit 605 transmits print data input to the hot folder to the printer 104 together with job tickets. That is, the print-data transmitting unit 605 transmits information sets each including a piece of print data and a job ticket to the printer 104. In the example shown in FIG. 6, the print data 01 and the job ticket 01 constitute an information set, and the print data 02 and the job ticket 02 constitute an information set. Although print data is transmitted to the printer 104 in the first embodiment, print data can be transmitted to a program (not shown) running on any of the clients 101 to 103 or on another system.

[Exemplary Operation]

Now, the operation of the print processing system configured as described above will be described. The CPU 200 of the computer shown in FIG. 2 executes processing relating to GUI screens shown in FIGS. 10 to 13 by reading and executing the control program (the print system 601) loaded into the RAM 202 and accepting the user's inputs to the GUI screens displayed on the display 207.

Figure 10:
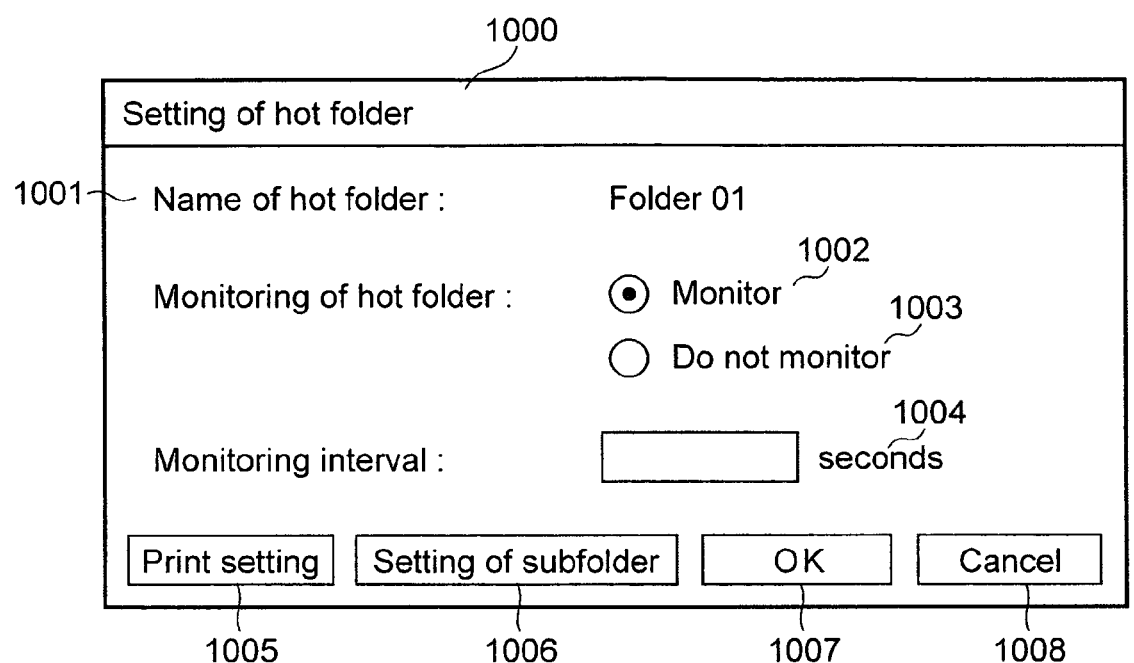
FIG. 10 is an illustration showing a user interface for setting of a hot folder in an embodiment of the present invention.

FIG. 10 shows an example of a user interface (GUI) for setting of a hot folder, such as setting of a monitoring interval of the hot folder, output setting of input print data, and setting of subfolders. A dialog window 1000 allows setting of a hot folder. A hot-folder-name field 1001 represents the name of a hot folder relevant to the setting set through the dialog window 1000. In the example shown in FIG. 10, the setting shown in FIG. 10 is reflected on a hot folder 01. Check boxes 1002 and 1003 allow selecting either "Monitor" or "Do not monitor" as to whether or not to monitor the hot folder. When the "Monitor" check box 1002 is selected, input to a monitoring-interval field 1004 is allowed. A button 1006 is used to proceed to setting of a subfolder. A subfolder will be described with reference to FIG. 11.

In the example shown in FIG. 10, for example, it is possible to select the "Monitor" checkbox 1002 and to set "10 seconds" in the monitoring-interval field 1004.

A subfolder-setting dialog window 1100 is displayed when a "Setting of subfolder" button 1006 shown in FIG. 10 is selected. The subfolder-setting dialog window 1100 is an example of a user interface for adding a subfolder input to a hot folder, or selecting a desired subfolder by a mouse or the like to execute editing, deleting, or print setting. In the first embodiment, subfolders refer to folders included in a folder. In the example shown in FIG. 6, subfolders refer to the subfolders 01 and 02 included in the folder 01. It is possible to set different print-setting information for individual subfolders.

Now, a specific example will be described with reference to FIG. 11. Let it be supposed that a folder includes subfolders with subfolder names of "Tab sheet 1", "Cover sheet", "Body 1", "Body 2", and "Tab sheet 2". When the folder including the plurality of subfolders is input to the hot folder configured as shown in FIG. 11, a print order is determined on the basis of the setting shown in FIG. 11. That is, the subfolders are printed in order of the subfolder names of "Cover sheet", "Body 1", "Tab sheet 1", "Body 2", and "Tab sheet 2".

Figure 12:
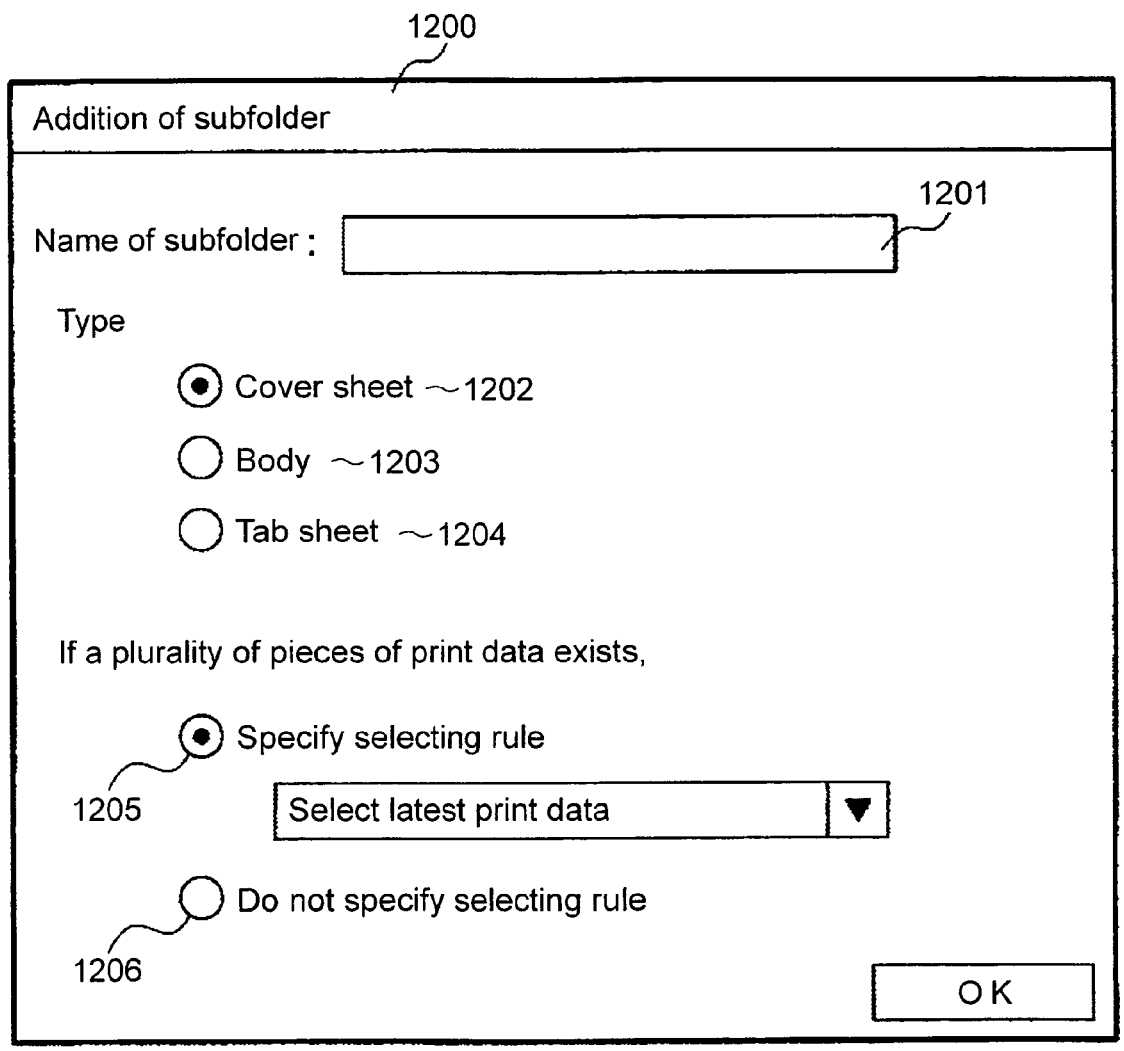
FIG. 12 is an illustration showing a user interface for newly adding a subfolder in an embodiment of the present invention.

A subfolder-adding dialog window 1200 shown in FIG. 12 is displayed when an "Add" button 1101 shown in FIG. 11 is selected. The subfolder-adding dialog window 1200 is an example of a user interface for newly registering a subfolder. In this window, the name and type of the subfolder, an operation in a case where a plurality of pieces of print data exist in the subfolder, and so forth, are set. The case where "a plurality of pieces of print data exist in the subfolder" refers to, for example, a case where two pieces of print data exist in the subfolder with the subfolder name of "Cover sheet". In this case, it is determined on the basis of the setting which of the two pieces of data is to be used for printing. In the example shown in FIG. 12, "Select latest print data" is selected, so that latest print data input to the subfolder is used for printing.

Figure 13:
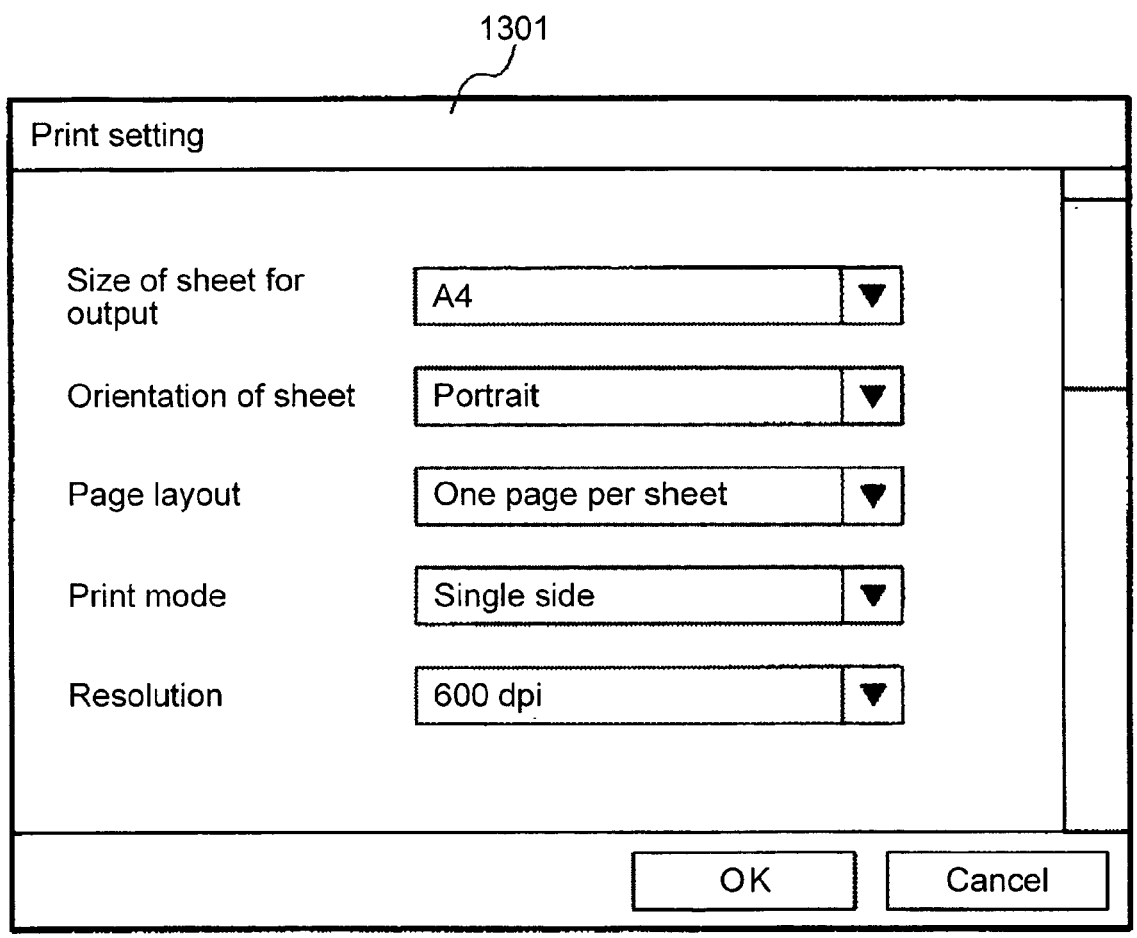
FIG. 13 is an illustration showing a user interface for print setting of a hot folder in an embodiment of the present invention.

FIG. 13 shows a print-setting dialog window 1301 that is displayed when a "Print setting" button 1005 shown in FIG. 10 or a "Print setting" button 1104 shown in FIG. 11 is selected. The setting made through the print-setting dialog window 1301 that is displayed when the "Print setting" button 1005 shown in FIG. 10 is selected is reflected on print data in the specific hot folder relevant to the setting in the example shown in FIG. 10.

The setting made through the print-setting dialog window 1301 displayed when a desired subfolder name is selected from the subfolder names displayed in the user interface shown in FIG. 11 and the "Print setting" button 1104 is pressed is saved in the RAM 202 in association with the desired subfolder name selected. Through the process described above, information regarding the print setting made through the user interface shown in FIG. 13 (also referred to as output information) is reflected on the print data included in the subfolder. Although print-setting information is saved in association with a subfolder name in the example shown in FIG. 13, print-setting information can be saved in association with other names relating to print data, such as the name of print data. The name relating to print data can be any information that allows identification of print data, such as a subfolder name or a print data name.

The setting made through the print-setting dialog window 1301 serves as print-setting information for defining various types of output format, such as a "print-sheet size" and "print orientation" of print data. The print setting is not limited to that shown in FIG. 13. The setting made through the dialog windows shown in FIGS. 10 to 13 is saved in the RAM 202 shown in FIG. 2, so that the CPU 200 can refer to and recognize the setting at a desired timing.

Now, the operation of the print system 601 after a user activates a print system 601 and inputs setting through the GUI screens shown in FIGS. 10 to 13 displayed by the function of the output-information setting unit 602 of the print system 602 will be described.

Figure 7:
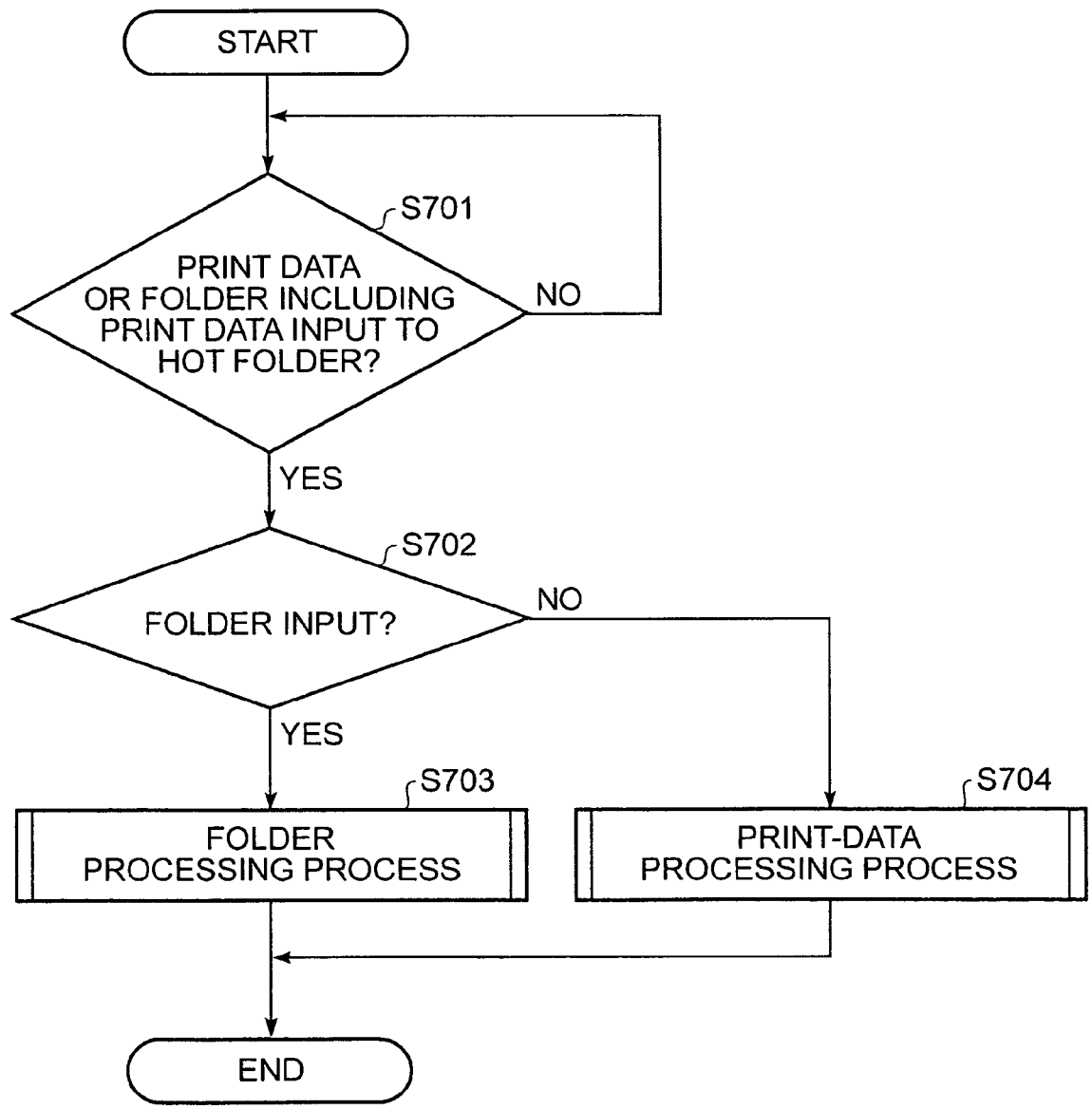
FIG. 7 is a flowchart of a process executed in an embodiment of the present invention, in which print data or a folder is input to a hot folder and the print data and job tickets are transmitted to a printer.

FIG. 7 is a flowchart of a process in which the hot-folder monitoring unit 603 of the print system 601 detects input of print data or a folder including print data to a hot folder and then transmits print data and job tickets to a printer. Processes according to flowcharts described in this specification are executed by the CPU 200 of the computer shown in FIG. 2 by reading and executing control programs loaded in the RAM 202.

In step S701, the hot-folder monitoring unit 603 checks whether print data or a folder including print data has been input to the hot folder. More specifically, since print data input to the hot folder is stored in the RAM 202, the hot-folder monitoring unit 603 can execute the checking in step S701 by checking whether print data or a folder including print data has been stored in a storage area of the RAM 202 corresponding to the hot folder. When it is detected in step S701 that print data or a folder including print data has been input, the hot-folder monitoring unit 603 proceeds to step S702.

In step S702, the hot-folder monitoring unit 603 checks whether the input detected in step S701 is an input of a folder. More specifically, the hot-folder monitoring unit 603 can execute the checking in step S702 by checking whether data stored in the storage area of the RAM 202 corresponding to the hot folder is a folder including print data.

When it is determined in step S702 that a folder has been input, the hot-folder monitoring unit 603 proceeds to a folder input process in step S703. On the other hand, when it is determined in step S702 that a folder has not been input, the hot-folder monitoring unit 603 determines that print data has been input, and proceeds to a print data input process in step S704.

Figure 8:
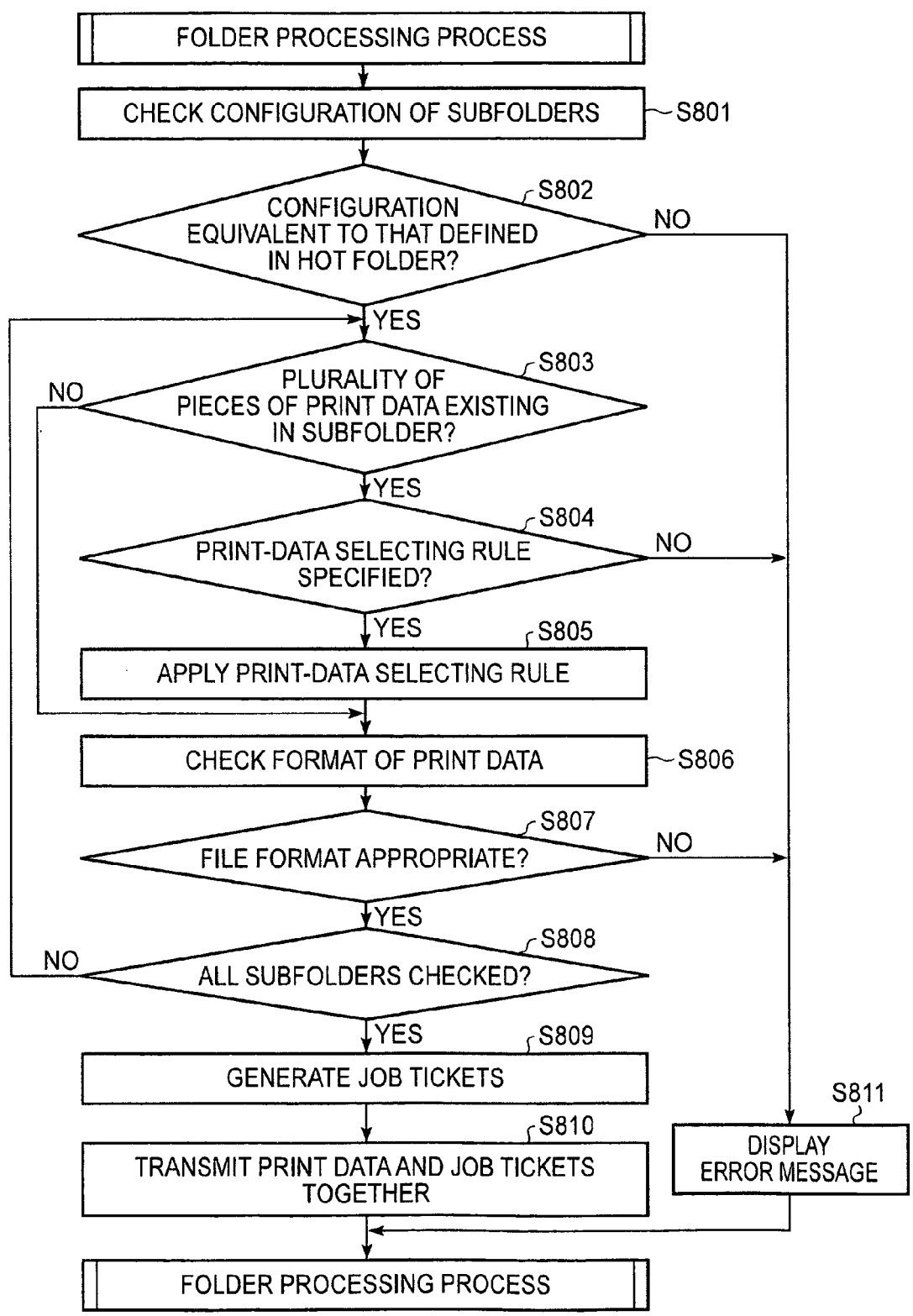
FIG. 8 is a flowchart of a folder input process executed in an embodiment of the present invention.

FIG. 8 is a flowchart of the folder input process in step S703, executed when a folder has been input to the hot folder (i.e., when step S702 results in Yes).

In step S801, the hot-folder monitoring unit 603 checks the configuration of a subfolder in the folder that has been input. More specifically, the hot-folder monitoring unit 603 can execute the checking in step S801 by checking the configuration in the folder stored in the storage area of the RAM 202 corresponding to the hot folder.

In step S802, the hot-folder monitoring unit 603 checks whether the subfolder configuration checked in step S801 is equivalent to the subfolder configuration set by the output-information setting unit 602 (i.e., the subfolder configuration shown in FIG. 11). More specifically, since the setting made through the dialog window shown in FIG. 11 is stored in the RAM 202, the hot-folder monitoring unit 603 can execute the checking in step S802 by comparing the subfolder configuration in the storage area of the RAM 202 storing the setting made through the user interface shown in FIG. 11 with the subfolder configuration checked in step S801.

When it is determined in step S802 that the subfolder configuration in the folder is equivalent to the subfolder configuration set through the user interface shown in FIG. 11, in step S803, the hot-folder monitoring unit 603 checks whether a plurality of pieces of print data exist in the subfolder in the folder that has been input. More specifically, since the information in the folder that has been input to the hot folder is stored in the storage area of the RAM 202 corresponding to the hot folder, the hot-folder monitoring unit 603 can analyze the subfolders in the folder by referring to the RAM 202, and recognize whether a plurality of pieces of print data exist in the subfolder on the basis of the result of the analysis.

When it is determined in step S803 that a plurality of pieces of print data exist in the subfolder, the hot-folder monitoring unit 603 proceeds to step S804. On the other hand, when it is determined in step S803 that a plurality of pieces of print data do not exist in the subfolder, the hot-folder monitoring unit 603 proceeds to step S806.

In step S804, the hot-folder monitoring unit 603 checks whether a selecting rule for a case where a plurality of pieces of print data exist has been set by the output-information setting unit 602 (FIG. 12). As described earlier, the setting made through the dialog window shown in FIG. 12 is stored in the RAM 202, so that the hot-folder monitoring unit 603 can execute the checking in step S804 by referring to the RAM 202.

When it is determined in step S804 that a print-data selecting rule has been set, the hot-folder monitoring unit 603 proceeds to step S805. On the other hand, when it is determined in step S804 that a print-data selecting rule is has not been set, the CPU 200 displays an error message in step S811, and then exits the process. In step S805, the hot-folder monitoring unit 603 selects a piece of print data according to the print-data selecting rule. More specifically, since the selecting rule is stored in the RAM 202, the hot-folder monitoring unit 603 can recognize the selecting rule by referring to the RAM 202 and select a piece of print data according to the selecting rule.

In step S806, the hot-folder monitoring unit 603 checks the file format of the subject print data. More specifically, since the print data input to the hot folder is stored in the RAM 202 as described earlier, the hot-folder monitoring unit 603 can execute the checking in step S806 by analyzing the print data.

In step S807, the hot-folder monitoring unit 603 checks whether the file format of the print data checked in step S806 is a file format permitted in the hot folder (e.g., text format). The file format can be, for example, PostScript (PS), the Portable Document Format (PDF), the Tag Image File Format (TIFF), or the Joint Photographic Experts Group (JPEG) format. Since information representing file formats that can be handled in the hot folder is stored in the RAM 202, the hot-folder monitoring unit 603 can execute the checking in step S807 by comparing the data format of the print data that has been input with the information representing the permitted file formats.

When it is determined in step S807 that the file format of the print data is permitted, the hot-folder monitoring unit 603 proceeds to step S808. On the other hand, when it is determined in step S807 that the file format of the print data is not permitted, the hot-folder monitoring unit 603 displays an error message in step S811, and exits the process.

In step S808, the hot-folder monitoring unit 603 checks whether all the subfolders in the folder input to the hot folder have been checked. When it is determined in step S808 that all the subfolders have been checked, the hot-folder monitoring unit 603 proceeds to step S809. On the other hand, when all the subfolders have not been checked, the hot-folder monitoring unit 603 returns to step S803 and checks a remaining folder.

In step S809, the job-ticket generating unit 604 generates a job ticket (also referred to as setting information) for print data in each of the subfolders input, using print setting (also referred to as output information) managed by the output-information setting unit 602 in association with the subfolder names (FIG. 13). Step S809 will be described in the context of a specific example. In this embodiment, information associating a subfolder name with print setting is stored in relation to a hot folder. When a folder including print data in a subfolder is input to the hot folder having the setting described above, it is checked whether a subfolder name coinciding with the input subfolder name is stored in the RAM 202. When a subfolder name coinciding with the input subfolder name is stored in the RAM 202, print-setting information stored in association with the subfolder name is applied to the print data in the input subfolder. Although print setting information that is applied is changed on the basis of the subfolder name, without limitation to the subfolder name, print-setting information can be changed on the basis of other names relating to print data, such as the name of print data in the folder input to the hot folder.

In step S810, the print-data transmitting unit 605 transmits the plurality of pieces of print data input to the hot folder and the job tickets (setting information) generated in step S809 together (i.e., a plurality of information sets of print data and job ticket) to the printer 104 (or stores the print data in association with the job tickets in a storage unit). Since the job tickets are generated using output information for printing, job tickets are herein also referred to simply as setting information. Through the process described above, step S703 shown in FIG. 7 is exited. As described above, by storing information relating to print data in association with print setting for the hot folder, it is possible to execute printing while reflecting different print settings on individual pieces of print data. Particularly, when printing is executed using a plurality of pieces of print data, according to this embodiment, it is possible to generate job tickets (setting information) using pieces of print-setting information (output information) associated with names relating to the pieces of print data (e.g., subfolder names or print-data names). This allows the user to obtain various output results by simple operations.

Figure 9:
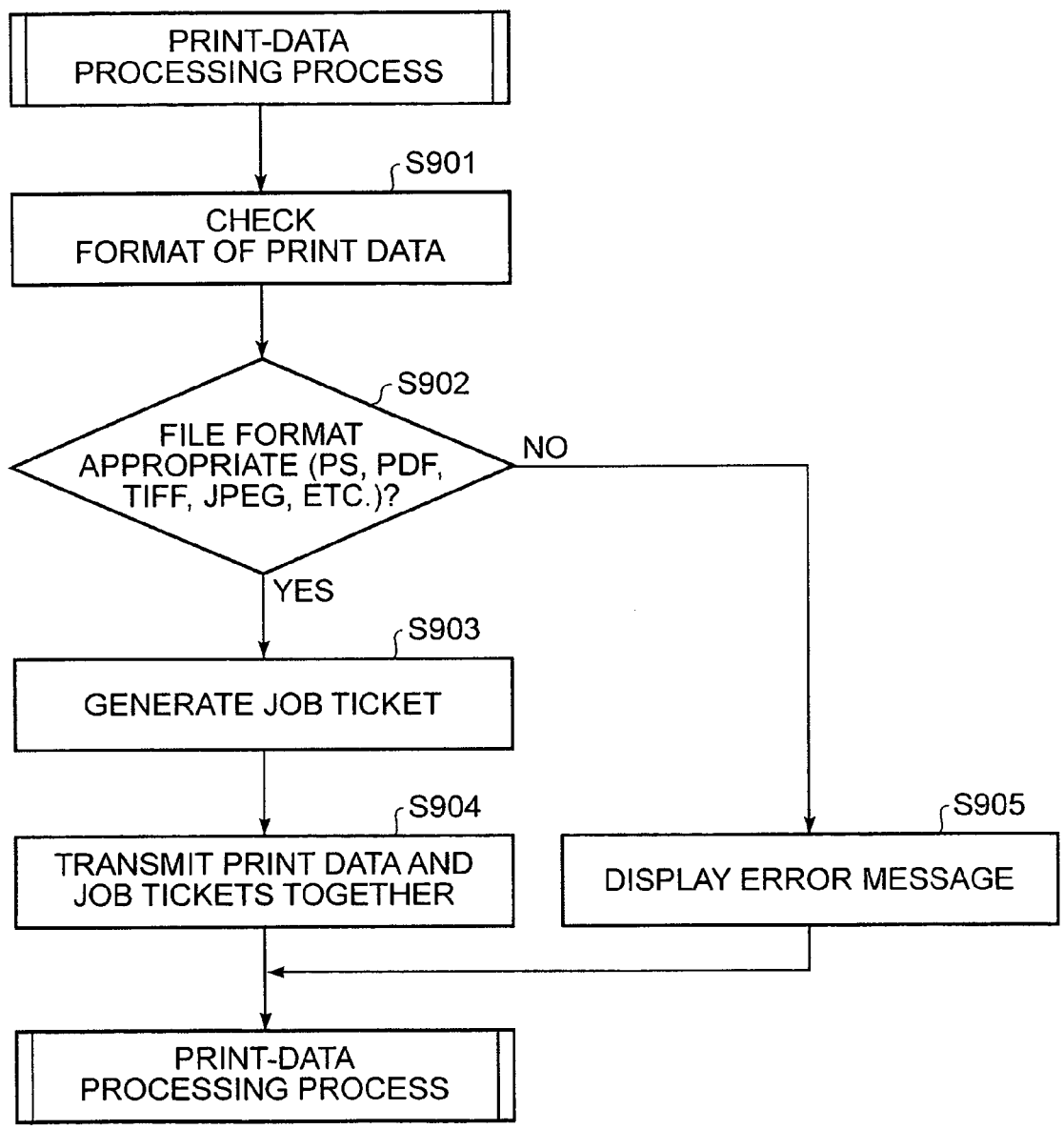
FIG. 9 is a flowchart of a print data input process in an embodiment of the present invention.

FIG. 9 is a flowchart of the print data input process in step S704 executed when print data has been input to the hot folder (i.e., when step S702 results in No).

In step S901, the hot-folder monitoring unit 603 checks the file format of the input print data. In step S902, the hot-folder monitoring unit 603 checks whether the file format is permitted in the hot folder (e.g., text format). The file format can be, for example, PostScript (PS), the Portable Document Format (PDF), the Tag Image File Format (TIFF), or the Joint Photographic Experts Group (JPEG) format. Steps S901 and S902 correspond to steps S806 and S807 described earlier with reference to FIG. 8, so that detailed description thereof will be omitted.

When it is determined in step S902 that the file format of the subject print data is permitted, the process proceeds to step S903. On the other hand, when it is determined that the file format is not permitted, an error message is displayed in step S905, and the process is then exited.

When it is determined in step S902 that the file format is permitted, in step S903, the job-ticket generating unit 604 generates a job ticket (setting information) using the print setting (FIG. 13) set for the holt folder by the output-information setting unit 602. In step S904, the print-data transmitting unit 605 transmits the print data and the job ticket generated in step S903 to the printer 104 (or stores the print data in association with the job ticket in a storage unit).

Although print data itself or a folder having a subfolder including print data is saved in the hot folder for printing in this embodiment, other information can be stored in the hot folder. For example, a folder including print data directly without an intermediate subfolder can be saved in the hot folder. In this case, a job ticket is generated using print-setting information (output information) associated with a print-data name as described earlier.

Second Exemplary Embodiment

In the first embodiment described above, print data or a folder having subfolder including print data is input to a hot folder, and the print data is transmitted to a printer together with a job ticket.

In a second embodiment of the present invention, subfolders are created in advance in a hot folder, pieces of print data are input to (saved in) the individual subfolders, and the pieces of print data and job tickets are transmitted to a printer when pieces of print data have been input to all the subfolders (or the pieces of print data have been stored in a storage unit in association with job tickets). The configuration and operation according to the second embodiment are basically the same as those according to the first embodiment described above, so that the following detailed description of the second embodiment with reference to the drawings will be directed mainly to points that differ from the first embodiment.

[Exemplary Configuration of Apparatus]

Figure 14:
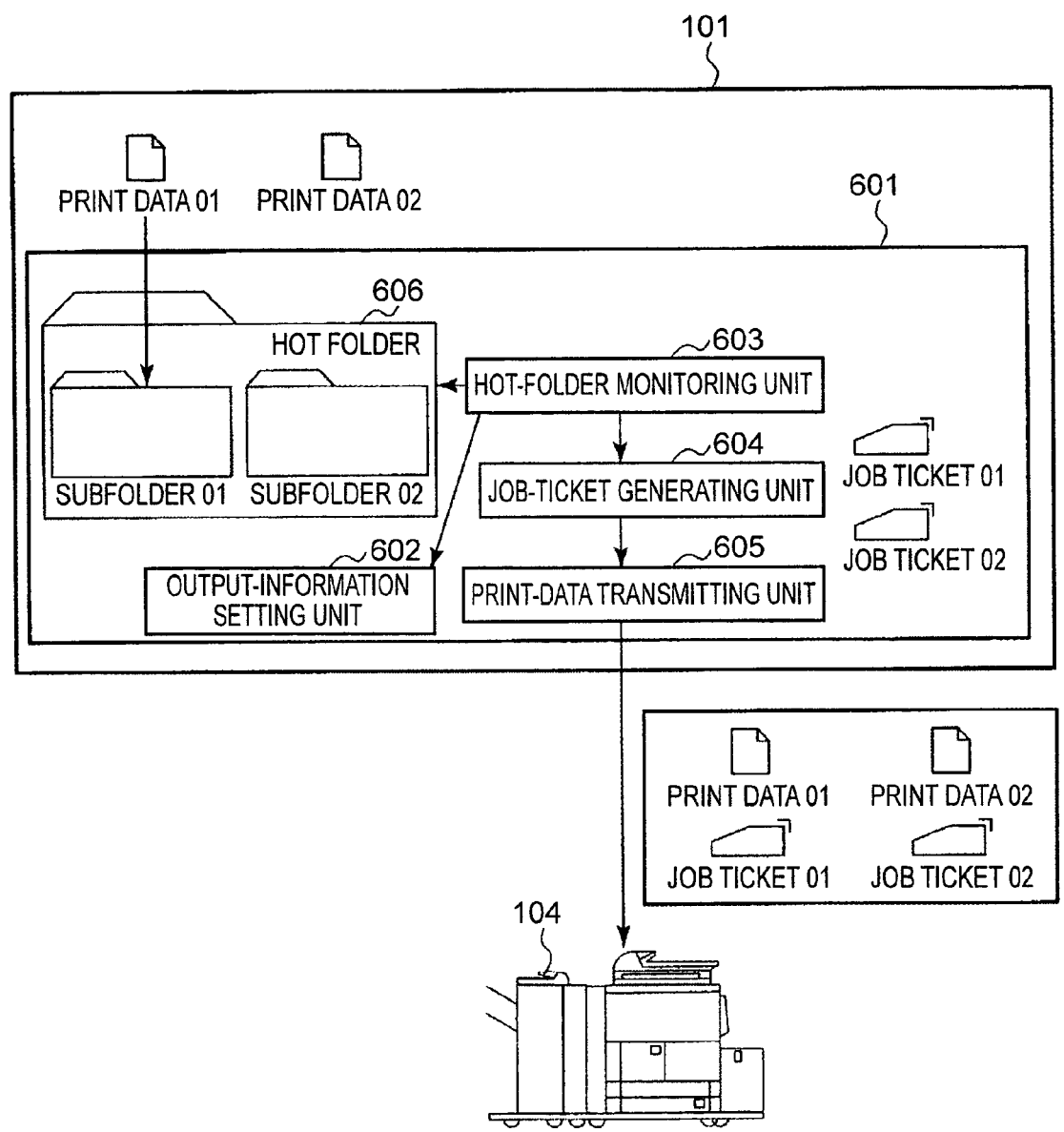
FIG. 14 is a diagram showing an example software configuration of a print system in an embodiment of the present invention.

FIG. 14 is a diagram showing the configuration of functional modules of the print system 601 implemented by a control program according to the second embodiment. The print system 601 processes print data input to a subfolder in a hot folder of the client 101 shown in FIG. 14.

An output-information setting unit 602 is used to set setting of a monitoring interval of the hot folder, print setting of print data input to the hot folder, setting of subfolders, print setting of individual subfolders, and so forth. The output-information setting unit 602 displays operation screens described later with reference to FIGS. 10 to 13 (having functions slightly different from the functions of the GUI screens in the first embodiment). Print setting is set in association with a folder name or a subfolder name and is stored in the RAM 202. Furthermore, in the second embodiment, a unit for creating subfolders 01 and 02 in the hot folder is provided, as will be described later with reference to FIG. 12.

A hot-folder monitoring unit 603 monitors events relating to the hot folder at a predetermined interval, such as input of print data. In the second embodiment, a unit for checking whether print data exits in all the subfolders is provided.

A job-ticket generating unit 604 generates job tickets 01 and 02 having print settings set by the output-information setting unit 602 for print data 01 and 02 input to the hot folder.

A print-data transmitting unit 605 transmits print data input to the hot folder to the printer 104 together with job tickets. Although print data is transmitted to the printer 104 in the second embodiment, print data can be transmitted as a single job to a program (not shown) running on one of the clients 101 to 103 or another system.

[Exemplary Operation]

Now, the operation of the print system 601 configured as described above will be described. The CPU 200 of the computer shown in FIG. 2 executes processing relating to the GUI screens shown in FIGS. 10 to 13 by reading and executing a control program (the print system 601) loaded in the RAM 202 and accepting the user's inputs to the GUI screens displayed on the display 207.

The GUI screens shown in FIGS. 10 and 13 are the same as those in the first embodiment described earlier, so that detailed description thereof will be omitted.

FIG. 11 shows an example of a user interface for allowing addition, editing, deletion, or print setting of a subfolder in a hot folder, which is displayed when the "Setting of subfolder" button is selected in the GUI screen shown in FIG. 10.

FIG. 12 shows an example of a user interface for newly creating a subfolder in a hot folder, which is displayed when the "Add" button is selected in the GUI screen shown in FIG. 11. In this example, a subfolder name, a folder type, and an operation executed when a plurality of pieces of print data exist in a subfolder (i.e., a selecting rule) are set. Now, the operation of the print system 601 executed after a user has activated the print system 601 and set setting through the GUI screens shown in FIGS. 10 to 13 displayed by the functions of the output-information setting unit 602 will be described.

Figure 15:
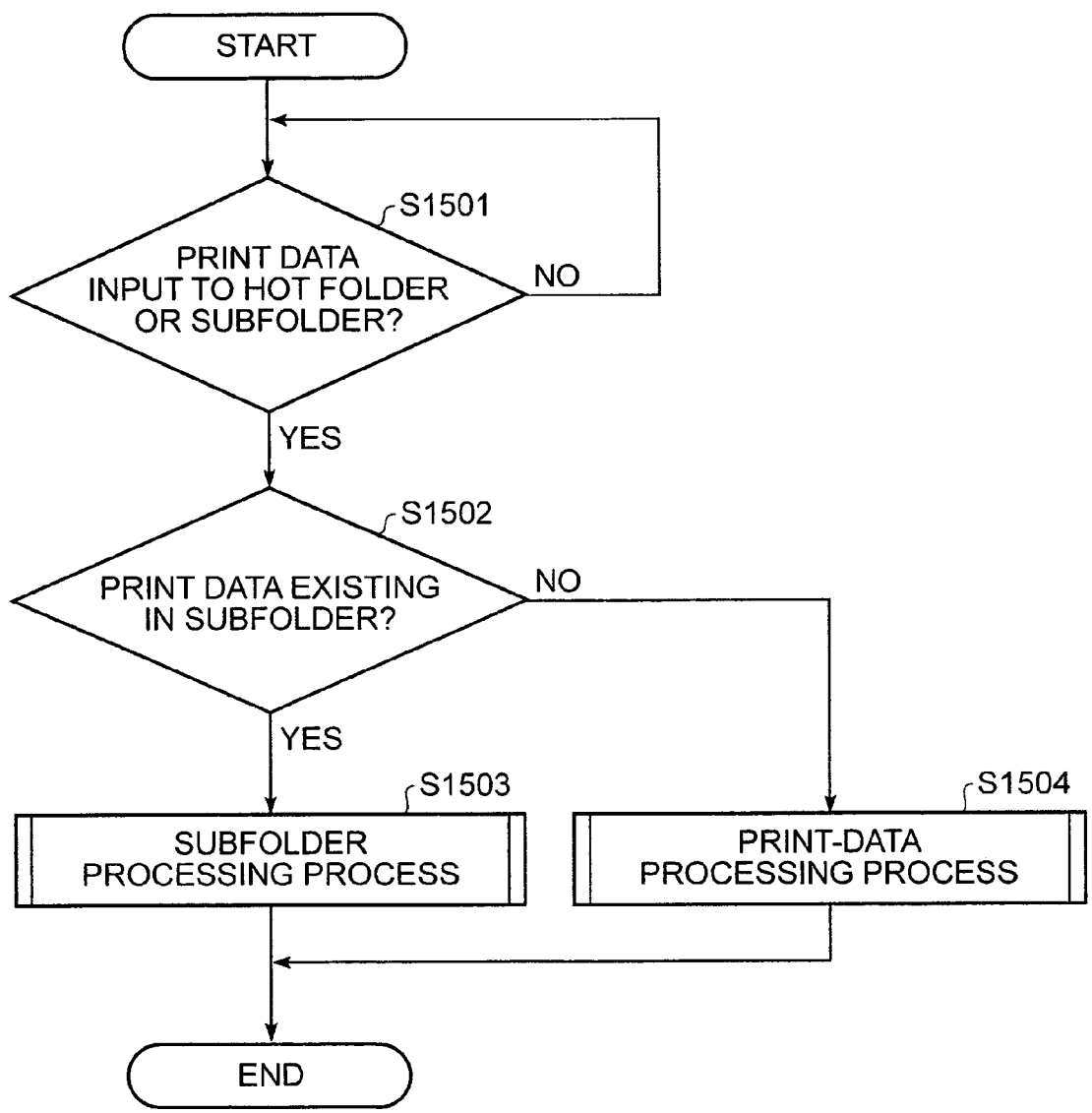
FIG. 15 is a flowchart of a process executed in an embodiment of the present invention, in which print data and job tickets are transmitted to a printer.

FIG. 15 is a flowchart of a process executed by the print system 601 in which input of print data to the hot folder or a subfolder is detected and the print data and a job ticket are transmitted to a printer. The CPU 200 of the computer described earlier with reference to FIG. 2 executes the processing procedure shown in FIG. 15 is by reading and executing a control program loaded in the RAM 202.

FIG. 15 shows the flow of an operation in which the hot-folder monitoring unit 603 detects input of print data to the hot folder or subfolders, the job-ticket generating unit 604 generates job tickets, and the print-data transmitting unit 605 transmits the print data and the job tickets to the printer 104.

In step S1501, the hot-folder monitoring unit 603 checks whether print data has been input to the hot folder or a subfolder. When input of print data is detected, the hot-folder monitoring unit 603 proceeds to step S1502. Since the processing in step S1501 is substantially the same as the processing in step S701 shown in FIG. 7, detailed description thereof will be omitted.

In step S1502, the hot-folder monitoring unit 603 checks whether print data exists in the subfolder as a result of the input detected in step S1501. More specifically, the hot-folder monitoring unit 603 can execute the checking in step S1502 by checking whether print data has been saved in a storage area corresponding to a subfolder in the hot folder.

When it is determined in step S1502 that print data exists in a subfolder, the hot-folder monitoring unit 603 proceeds to a subfolder input process in step S1503, which will be described later. On the other hand, when it is determined in step S1502 that print data does not exist in the subfolder, the hot-folder monitoring unit 603 proceeds to a print data input process in step S1504, described earlier with reference to FIG. 9.

Figure 16:
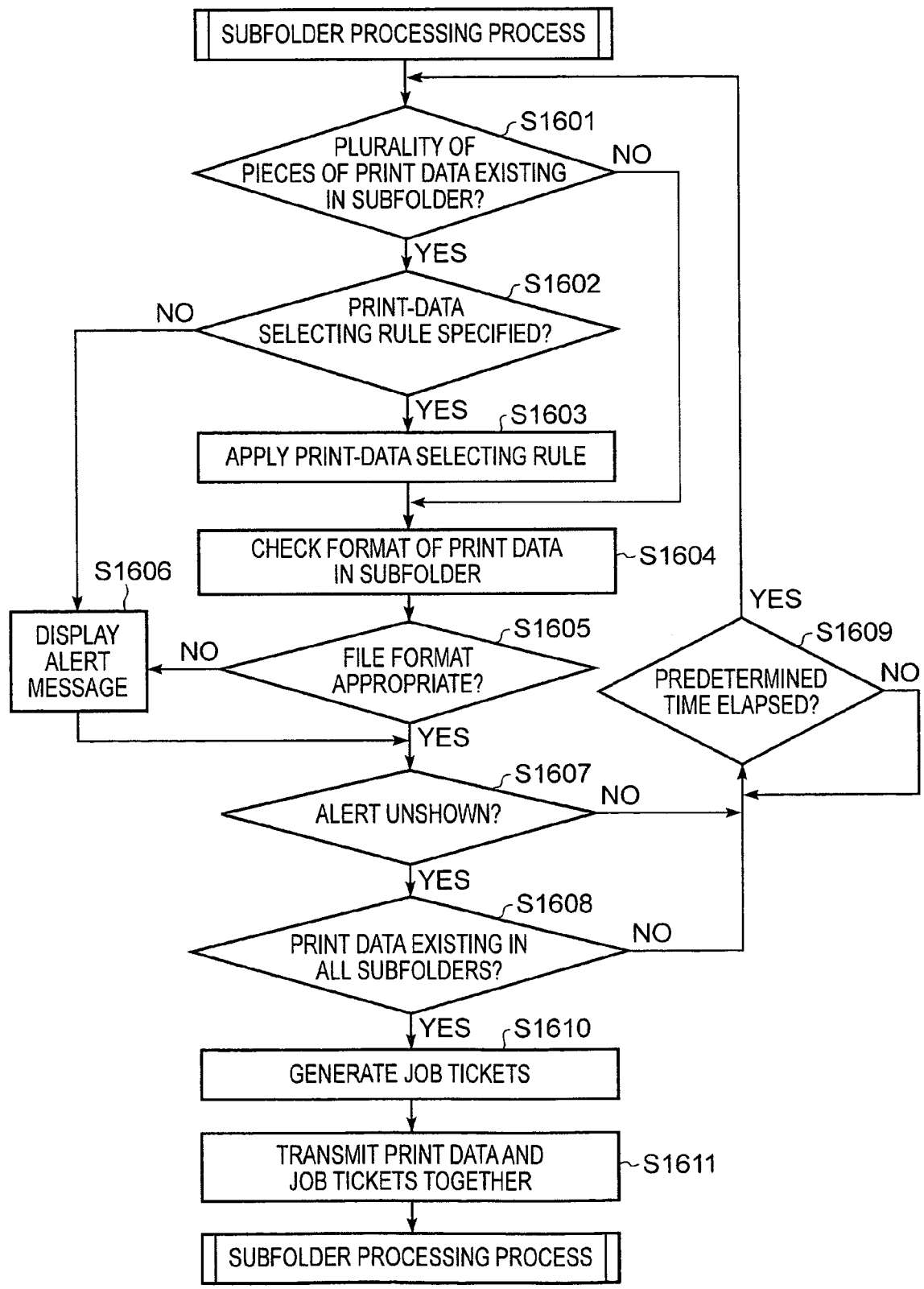
FIG. 16 is a flowchart of a subfolder input process in an embodiment of the present invention.

FIG. 16 is a flowchart of the subfolder input process in step S1503, which is executed when print data is input to a subfolder (i.e., when step S1502 shown in FIG. 15 results in Yes).

In step S1601, the hot-folder monitoring unit 603 checks whether a plurality of pieces of print data exist in a single subfolder. Since the processing in step S1601 is equivalent to the processing in step S803 shown in FIG. 8, detailed description thereof will be omitted. When it is determined in step S1601 that a plurality of pieces of print data exist in the subfolder, the hot-folder monitoring unit 603 proceeds to step S1602. Otherwise, the hot-folder monitoring unit 603 proceeds to step S1604.

In step S1602, the hot-folder monitoring unit 603 checks whether a selecting rule for a case where a plurality of pieces of print data exists (FIG. 12) have been set by the output-information setting unit 602 for the subject hot folder. Since the processing in step S1602 is equivalent to the processing in step S804 shown in FIG. 8, detailed description thereof will be omitted.

When it is determined in step S1602 that a selecting rule has been set, the hot-folder monitoring unit 603 proceeds to step S1603. Otherwise, the hot-folder monitoring unit 603 proceeds to step S1607.

In step S1603, the hot-folder monitoring unit 603 selects a piece of print data according to the print-data selecting rule. In step S1604, the hot-folder monitoring unit 603 checks the file format of the subject print data in the subfolder. In step S1604, the hot-folder monitoring unit 603 determines whether the file format is permitted in the hot folder (e.g., text format). Since the processing in steps S1604 and S1605 is equivalent to the processing in steps S806 and S807 shown in FIG. 8, detailed description thereof will be omitted.

When it is determined in step S1605 that the file format is permitted, the hot-folder monitoring unit 603 proceeds to step S1607. On the other hand, when it is determined that the file format is not permitted, an alert message is displayed, and the process then proceeds to step S1607. When an alert message is issued, for example, a flag indicating that the alert message is issued is set. This allows execution of step S1607 described later. For the purpose of recognizing the alert message, without limitation to the flag, other schemes can be used.

In step S1607, the hot-folder monitoring unit 603 checks whether an alert message has been displayed in step S1606. As described above, this step can be executed by checking whether a flag indicating that an alert message is displayed is set.

When it is determined in step S1607 that an alert message is displayed, the hot-folder monitoring unit 603 proceeds to step S1609. Otherwise, the hot-folder monitoring unit 603 proceeds to step S1608.

In step S1608, the hot-folder monitoring unit 603 checks whether print data exists in all the subfolders in the hot folder. More specifically, the hot-folder monitoring unit 603 can execute the checking in step S1608 by checking whether print data is stored in a memory area corresponding to a subfolder in the hot folder.

When it is determined in step S1608 that print data exists in all the subfolders, the hot-folder monitoring unit 603 proceeds to step S1610. Otherwise, the hot-folder monitoring unit 603 proceeds to step S1609.

In step S1609, the hot-folder monitoring unit 603 checks whether a monitoring interval set by the output-information setting unit 602 (FIG. 10) has elapsed. More specifically, the hot-folder monitoring unit 603 executes the checking in step S1609 by comparing a result of measurement by an internal timer of the information processing apparatus with the monitoring interval set through the user interface screen shown in FIG. 10 to determine whether the measured time exceeds the print interval. When it is determined in step S1609 that the monitoring interval set in the user interface screen shown in FIG. 10 has elapsed, the hot-folder monitoring unit 603 returns to step S1601.

When it is determined in step S1608 that print data exists in all the subfolders of the hot folder in step S1608, in step S1610, the job-ticket generating unit 604 generates a job ticket for print data input to each subfolder, in accordance with the print setting set for each subfolder (FIG. 13). More specifically, a subfolder in the hot folder is stored in the RAM 202 in association with print setting information (output information). Thus, when print data is saved in a subfolder of the hot folder, print setting information (output information) associated with the subfolder is applied to the print data, and a job ticket (also referred to as setting information) is generated accordingly.

In step S1611, the print-data transmitting unit 605 transmits a plurality of pieces of print data and job tickets generated in step S1610 together (i.e., a plurality of sets of print data and job ticket) to the printer 104 (or stores the print data in association with the job ticket in a storage unit).

According to the second embodiment, by creating subfolders associated with desired print settings in a hot folder, a user can apply different print settings to pieces of print data input to the individual subfolders. Furthermore, generation of job tickets and printing are executed after confirming that print data has been input to all the subfolders, so that the efficiency of user operation is improved. Furthermore, when subfolders are created in the hot folder, the subfolders can be generated so as to form a hierarchical structure. By storing print data in association with print-setting information (output information) on the basis of layers of the hierarchy as described above, management of subfolders and output information is facilitated. This serves to improve the efficiency of user operations.

Third Exemplary Embodiment

In the first embodiment described earlier, when print data or a folder having a subfolder including print data is input to a hot folder and the print data and a job ticket are transmitted to a printer, print setting of the subfolder is managed in association with a subfolder name.

In the second embodiment described above, print data are input to subfolders created in a hot folder, and print setting is set individually for each of the subfolders.

In a third embodiment of the present invention, print setting of subfolders is managed in association with the depths of layers of the subfolders. The configuration and operation of the apparatus are basically the same as those in the first embodiment, so that the following detailed description with reference to the drawings will be directed mainly to points that differ from the first embodiment.

[Exemplary Configuration of Apparatus]

Figure 17:
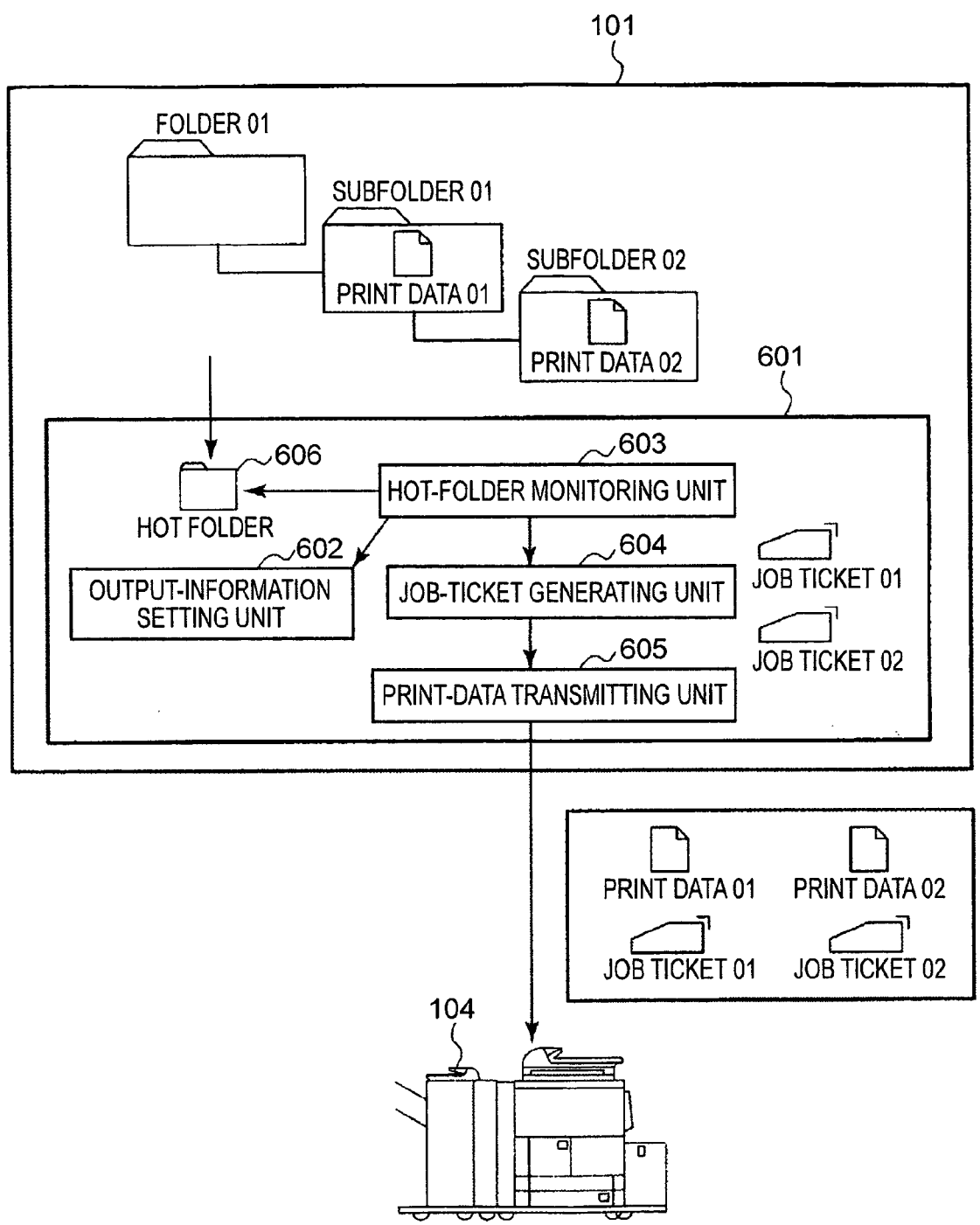
FIG. 17 is a diagram showing an example software configuration of a print system in an embodiment of the present invention.

FIG. 17 is a diagram showing the configuration of functional modules of a print system 601 implemented by a control program according to the third embodiment. The print system 601 executes a process described later when print data or a plurality of pieces of print data included in a folder 01 shown in FIG. 17 is input to a hot folder 606 of the client 101.

Figure 19:
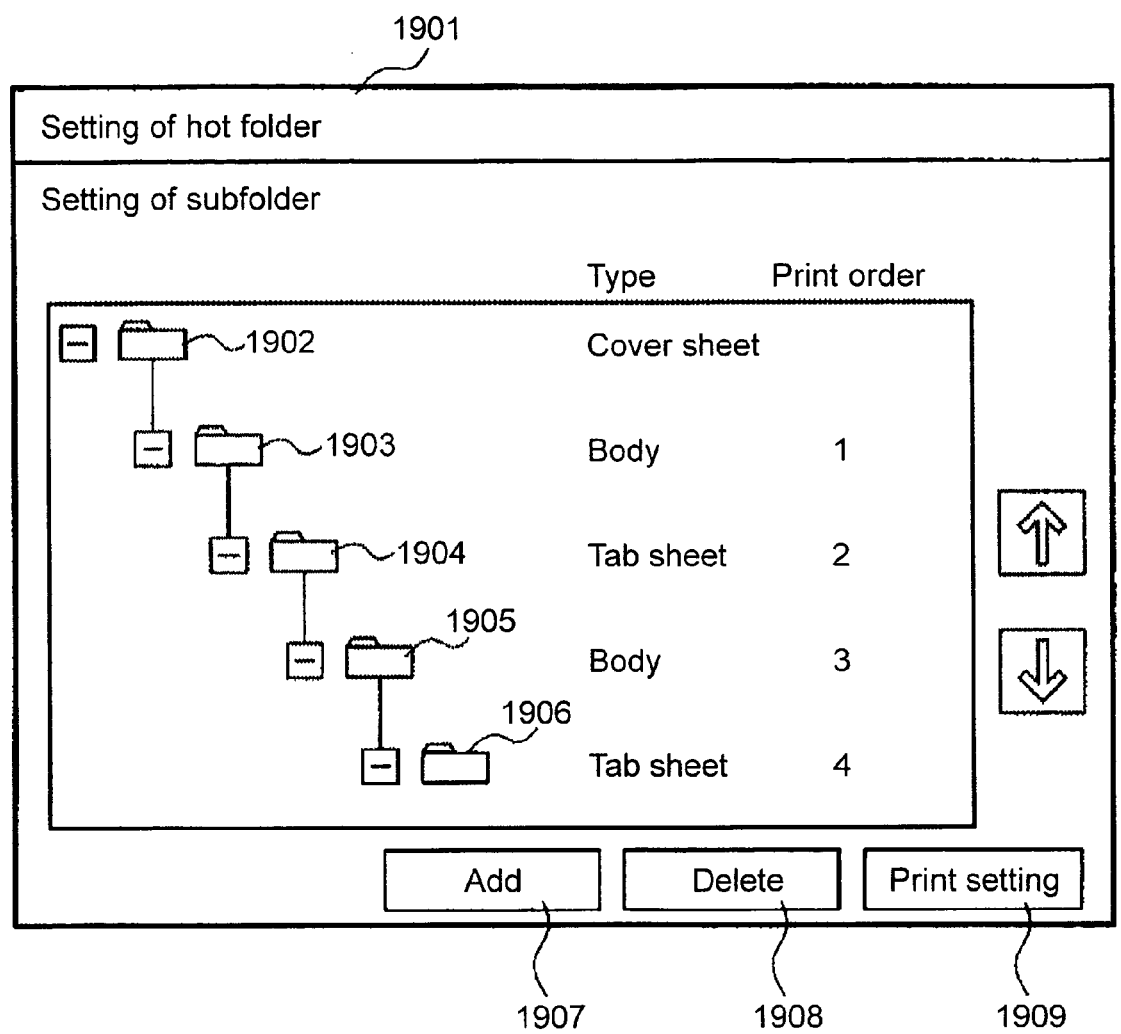
FIG. 19 is an illustration of a user interface for setting of a subfolder in an embodiment of the present invention.

An output-information setting unit 602 allows setting of a monitoring interval of the hot folder, print setting of print data input to the hot folder, setting of subfolders, print setting for individual subfolders, and so forth. The output-information setting unit 602 presents operation screens such as the ones shown in FIG. 10, FIG. 13, and FIGS. 19 to 21. Regarding setting of a subfolder as shown in FIG. 19, in a subfolder setting dialog window 1901, a type and a print order are set for each subfolder 1902 to 1906. In the example shown in FIG. 19, the number of pages increases as the layer of the subfolder becomes deeper. When a "Print setting" button is selected with a subfolder of a certain layer selected, the dialog window described earlier with reference to FIG. 23 is displayed, and setting of print setting information (output information) in association with the layers of the subfolders. Furthermore, when an "Add" button 1907 is selected, a new subfolder (layer) is displayed to allow setting. In an example shown in FIG. 19, setting has been set up to a subfolder (layer) 1906, and it is possible to add a new subfolder (layer) by selecting the "Add" button 1907. As described above, print setting is set individually for each layer of subfolders, and the print setting is managed in the RAM 202 in association with the depths of the subfolders.

In some cases, a situation could arise where a folder has a layer deeper than the depth set for the hot folder via the GUI screen shown in FIG. 19. Although settings for five layers are set in the hot folder 606 in the GUI screen for setting of a subfolder, a situation could arise where a folder in a layer deeper than the five layers is input to the hot folder 606. In that case, a GUI screen shown in FIG. 20 is displayed.

Figure 20:
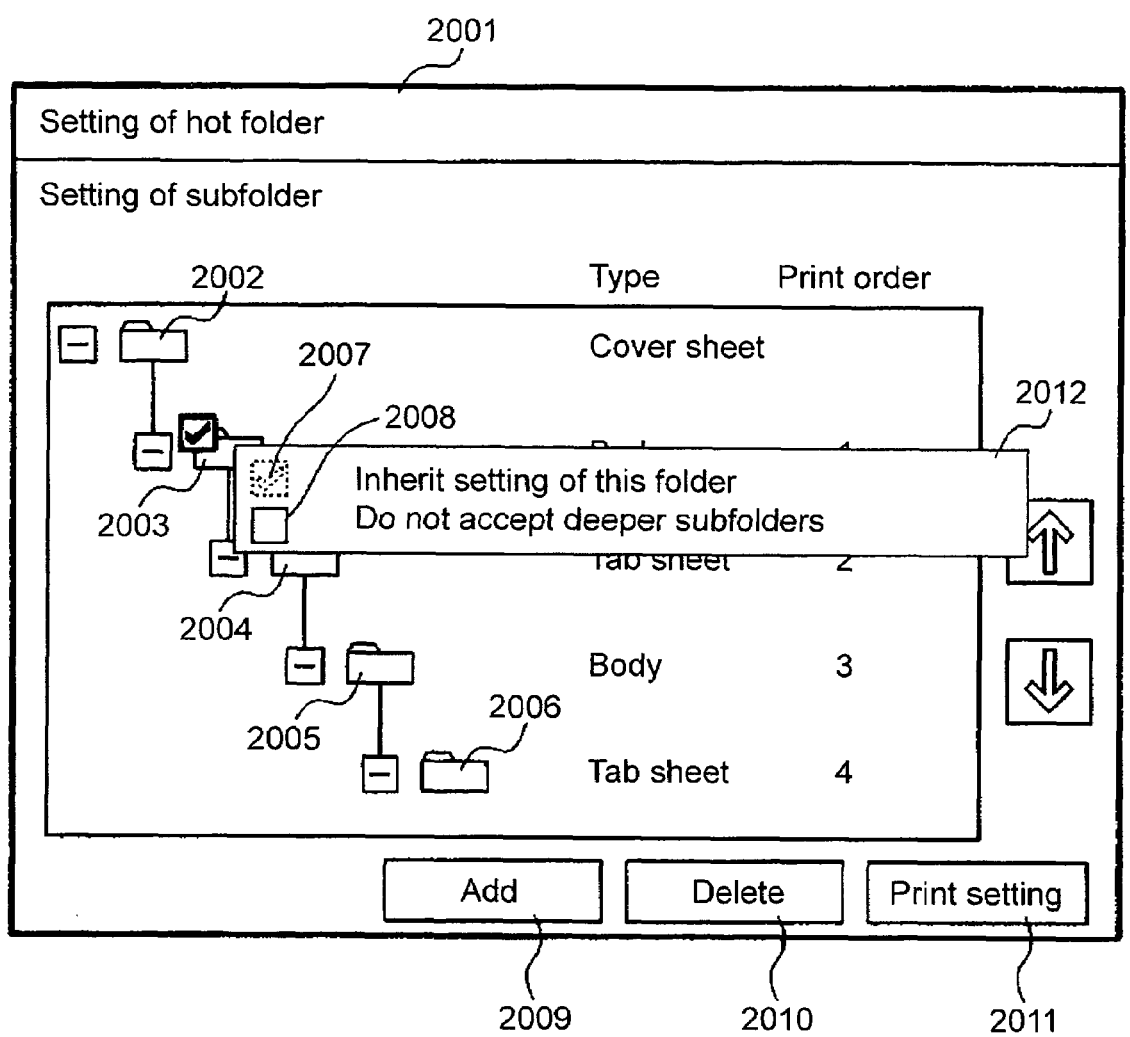
FIG. 20 is an illustration showing an example of a user interface for setting of an operation in an embodiment of the present invention.

Referring to FIG. 20, a dialog window 2012 is displayed by a predetermined operation. The dialog window 2012 allows setting of "Inherit setting of this folder" 2007 and setting of "Do not accept deeper subfolders" 2008. In the example shown in FIG. 20, the "Inherit setting of this folder" checkbox 2007 is checked so that it is specified that the setting of a second-layer subfolder 2003 be inherited. Thus, when a folder having a layer deeper than a specified depth is input, print setting set for the subfolder 2003 on the second layer is inherited by subfolders at layers deeper than the subfolder 2006. Furthermore, when the "Do not accept deeper subfolders" checkbox 2008 is selected, input of a subfolder deeper than the specified layer is prohibited.

Figure 21:
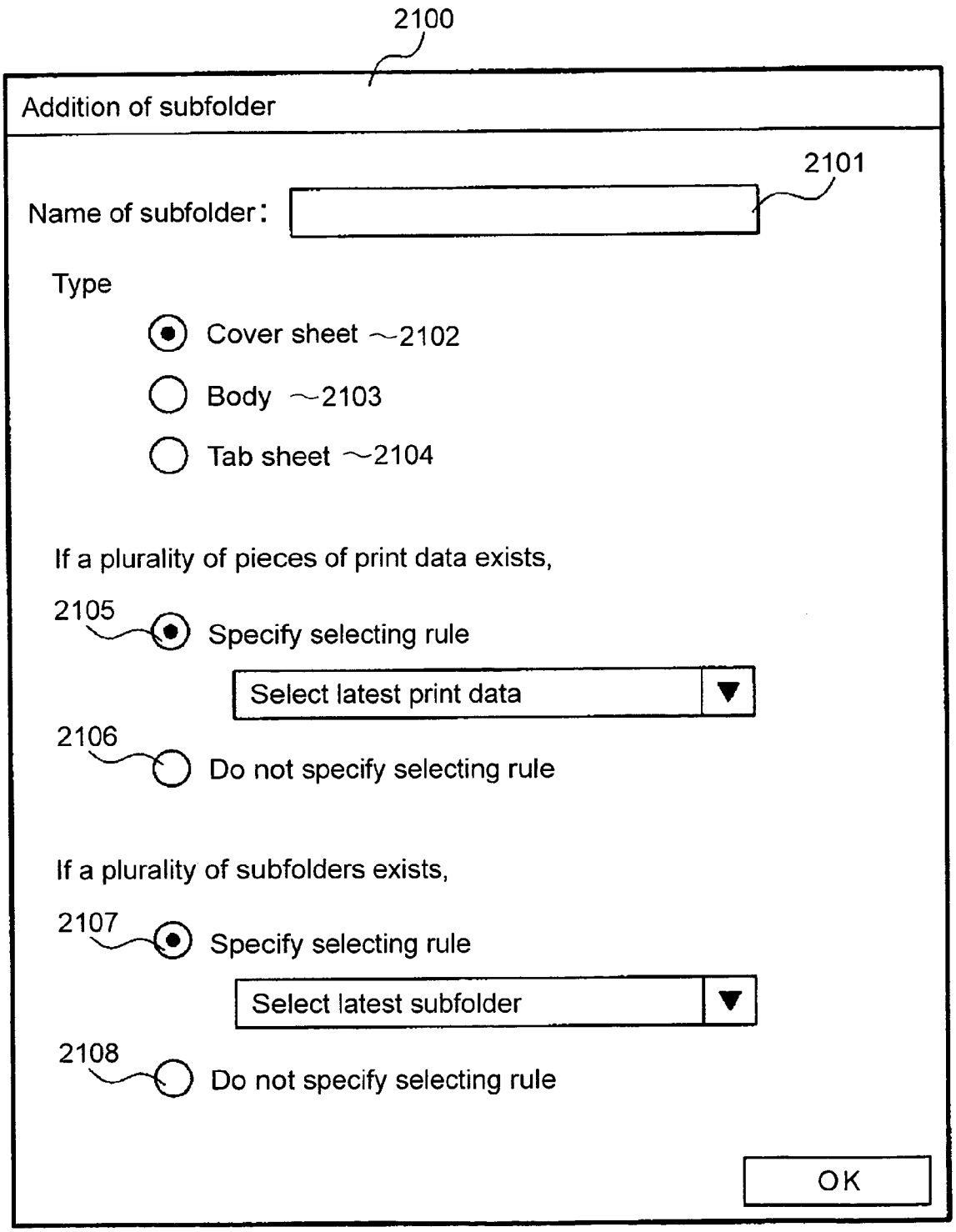
FIG. 21 is an illustration showing a user interface for newly adding a subfolder in an embodiment of the present invention.
Figure 22:
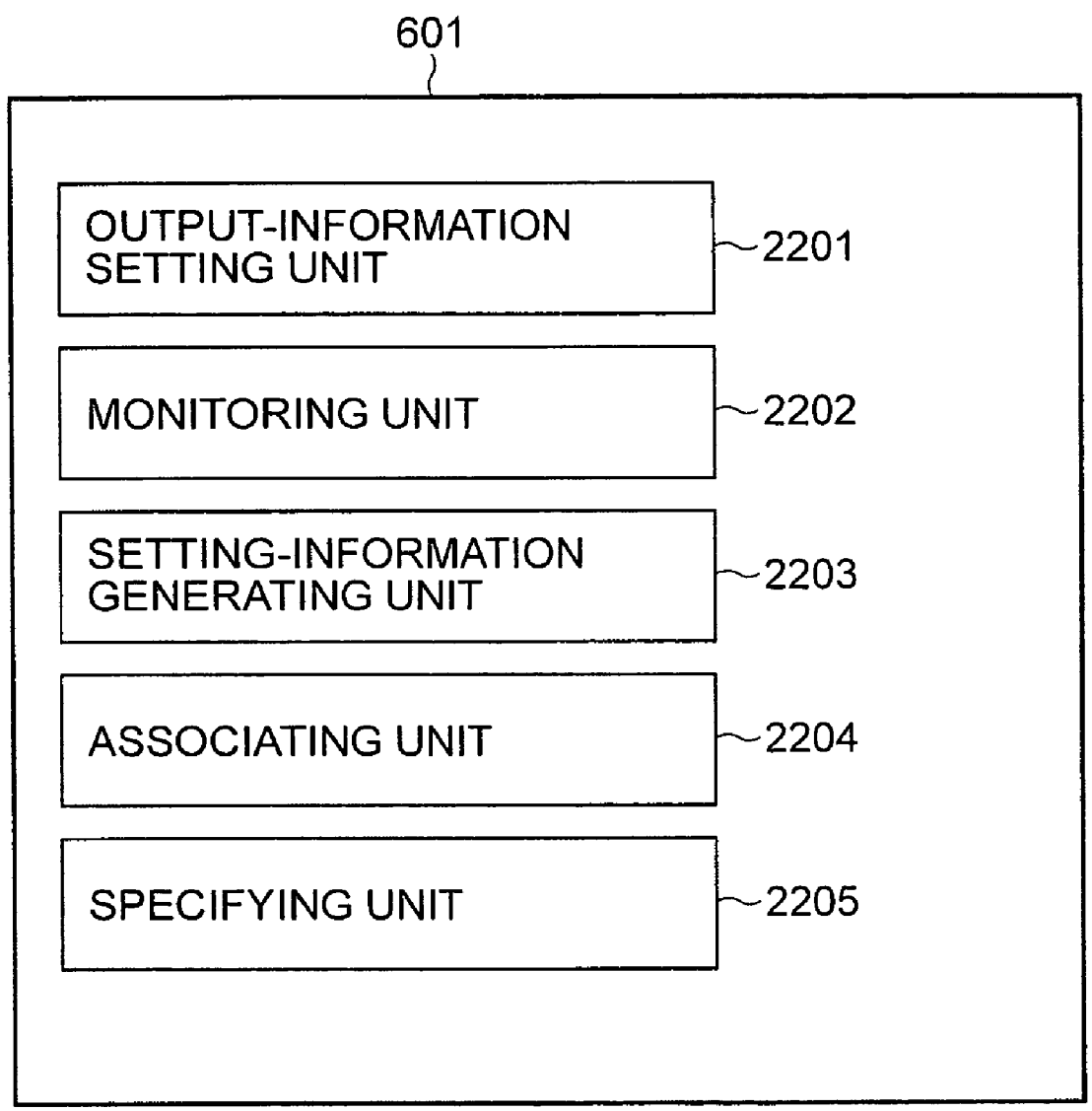
FIG. 22 is a diagram showing an example functional configuration of a print system in an embodiment of the present invention.

FIG. 21 shows a dialog window 2100 for allowing setting of a print rule applied in a case where a plurality of pieces of print data or a folder having a plurality of subfolders in the same layer are input to the hot folder. Steps S2101 to S2106 shown in FIG. 21 correspond to steps S1201 to S1206 shown in FIG. 12, so that description thereof will be omitted.

Checkboxes 2107 and 2108 are used to select a selecting rule that is to be applied when a plurality of subfolders exist in the same layer of the folder input to the hot folder. When the checkbox 2107 is selected, print data stored in a subfolder that is created most recently in the same layer among the subfolders is printed. The information representing the setting set through the screen shown in FIG. 21 is stored in the RAM 202.

A hot-folder monitoring unit 603 monitors input of print data or a folder to the hot folder at a predetermined interval.

A job-ticket generating unit 604 generates job tickets 01 and 02 having print settings set by the output-information setting unit 602 for pieces of print data 01 and 02 input to the hot folder.

A print-data transmitting unit 605 transmits the pieces of print data 01 and 02 input to the hot folder and the job tickets 01 and 02 together to the printer 104. Although print data is transmitted to the printer 104 in the third embodiment, a single integrated job can be generated and transmitted to a program (not shown) running on one of the clients 101 to 103 or another system.

[Exemplary Operation]

Now, the operation of the print processing system 601 configured as described above will be described. The CPU 200 described earlier with reference to FIG. 2 executes the processing relating to the GUI screens shown in FIG. 10, FIG. 13, and FIGS. 19 to 21 is by reading and executing a control program (i.e., the print system 601) read and loaded into the RAM 202 and accepting the user's inputs through the GUI screens.

The GUI screens shown in FIGS. 10 and 13 are the same as those in the first embodiment described earlier.

FIG. 19 shows an example of a user interface for associating layers of subfolders input to the hot folder with print setting of print data in the subfolders, which is displayed when the "Setting of subfolder" button is pressed in FIG. 10. Referring to FIG. 19, a "Print setting" button 1909 is selected with a certain layer selected, and print setting is entered through the user interface shown in FIG. 19. Thus, by opening the user interface shown in FIG. 13 and making print setting, the print setting set in the user interface is associated with the layer. These pieces of information are stored in the RAM 202.

FIG. 20 shows an example of a user interface for allowing an operation when a subfolder of a layer deeper than the layer specified in FIG. 19. A user displays a popup in the foreground of the GUI screen shown in FIG. 20, using a mouse or the like, and selects a desired checkbox. In the example shown in FIG. 20, the "Inherit setting of this folder" button is checked and a desired folder is checked.

FIG. 21 shows an example of a user interface for newly registering a subfolder, which is displayed when the "Add" button shown in FIG. 19 is selected. The details of the user interface have been described earlier in detail.

Now, the operation of the print system 601 in which the user activates the print system 601 and sets settings through the GUI screens shown in FIGS. 10, 13, and 19 to 20, displayed by the functions of the output-information setting unit 602 will be described.

Again in the third embodiment, a process is executed according to the flowchart shown in FIG. 7. The flow of the processing is the same as that in the first embodiment.

Figure 18:
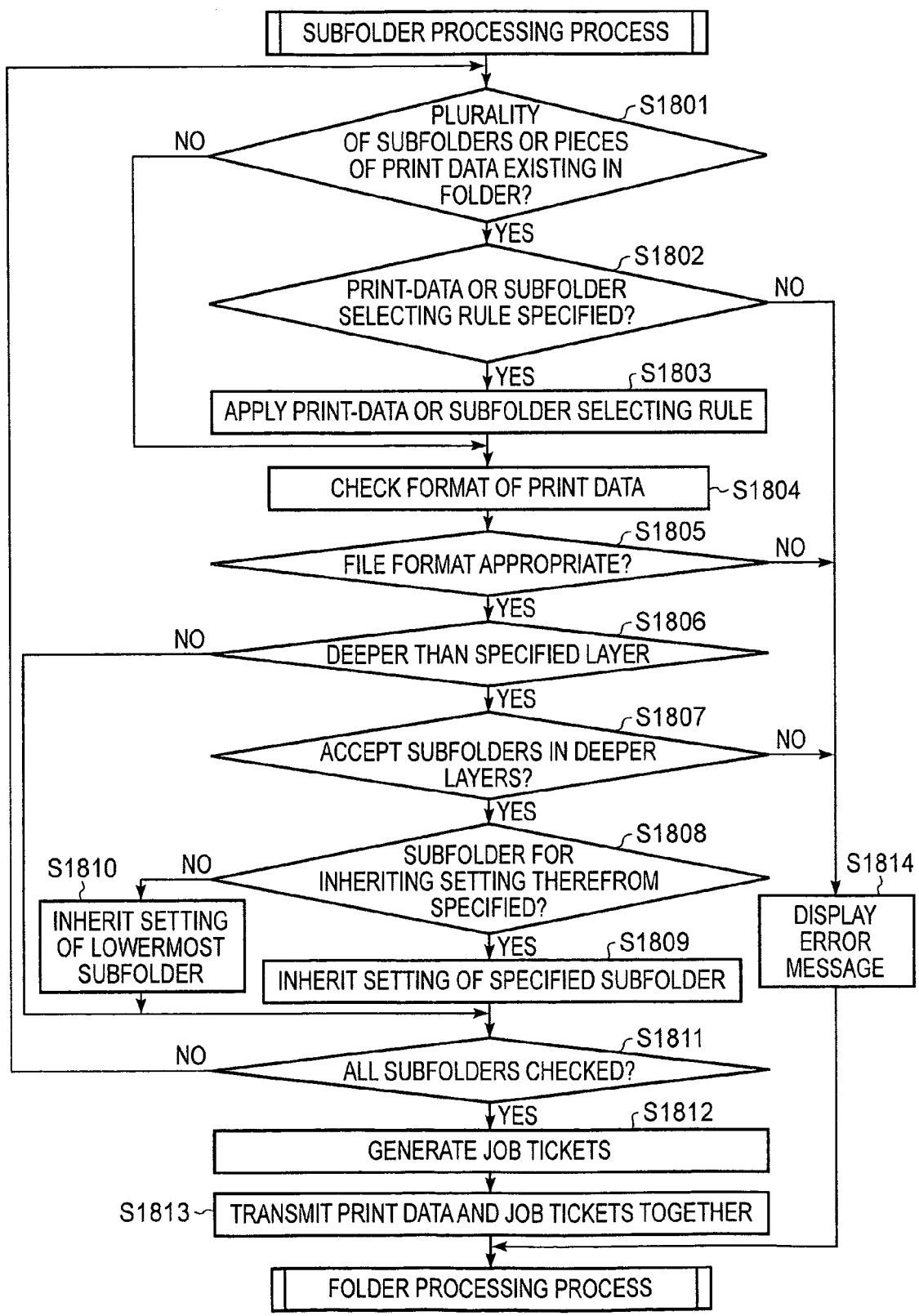
FIG. 18 is a flowchart of a folder input process in an embodiment of the present invention.

FIG. 18 is a flowchart of a process that is called from step S703 in the flowchart of FIG. 7 (i.e., a process executed when a folder is input to the hot folder).

In step S1801, the hot-folder monitoring unit 603 checks whether a plurality of pieces of print data or a folder including a plurality of subfolders in the same layer exist in the hot folder. In this example, since the number of subfolders in a single layer is one, step S1801 results in "No". On the other hand, even when only a single subfolder exits in a layer as shown in FIG. 17, when a plurality of pieces of print data are included in a subfolder, step S1801 results in "Yes". Step S1801 substantially coincides with step S803 described earlier with reference to FIG. 8, detailed description thereof will be omitted.

When step S1801 results in Yes, the hot-folder monitoring unit 603 proceeds to step S1802. When step S1801 results in No, the hot-folder monitoring unit 603 proceeds to step S1804.

In step S1802, the hot-folder monitoring unit 603 checks whether a selecting rule (FIG. 2) applied in a case where a plurality of pieces of print data exist or a folder including a plurality of subfolders in the same layer has been set by the output-information setting unit 602. The processing in step S1802 is substantially the same as the processing in step S804 shown in FIG. 8, so that detailed description thereof will be omitted.

When it is determined in step S1802 that a selecting rule has been set, the hot-folder monitoring unit 603 proceeds to step S1803. When no selecting rule has been set, the hot-folder monitoring unit 603 displays an error message in step S1814, and then exits the process.

In step S1803, the hot-folder monitoring unit 603 selects a subfolder or print data according to the subfolder selecting rule or the print data selecting rule. The processing in step S1803 is equivalent to the processing in step S805 described with reference to FIG. 8, so that detailed description thereof will be omitted.

In step S1804, the hot-folder monitoring unit 603 checks the file format of subject print data in the subject subfolder. In step S1805, the hot-folder monitoring unit 603 checks whether the file format is permitted in the hot folder. The processing in steps S1804 and S1805 is equivalent to the processing in step S806 and S807 shown in FIG. 8, so that detailed description thereof will be omitted.

When it is determined in step S1805 that the file format is permitted, the hot-folder monitoring unit 603 proceeds to step S1806. When it is determined in step S1805 that the file format is not permitted, the hot-folder monitoring unit 603 displays an error message in step S1814, and then exits the process.

In step S1806, the hot-folder monitoring unit 603 checks whether the layer of the subfolder input to the hot folder is deeper than the layer (FIG. 19) of the subfolder set by the output-information setting unit 602. More specifically, since the number of layers set in the screen shown in FIG. 19 is stored in the RAM 200, the hot-folder monitoring unit 603 can execute the checking in step S186 by comparing the layer of the subfolder input to the hot folder with the layer set in the screen shown in FIG. 19.

When it is determined in step S1806 that the layer of the subfolder input to the hot folder is deeper than the layer set in the hot folder, the hot-folder monitoring unit 603 proceeds to step S1807. Otherwise, the hot-folder monitoring unit 603 proceeds to step S1811.

In step S1807, the hot-folder monitoring unit 603 checks whether the setting set by the output-information setting unit 602 accepts subfolders in layers deeper than the specified layer (i.e., whether "Do not accept subfolders in deeper layers" is deactivated). More specifically, since the setting made as shown in FIG. 20 is stored in the RAM 202, so that the hot-folder monitoring unit 603 can execute the checking in step S1807 by referring to the RAM 202.

When it is determined in step S1807 that the setting accepts subfolders in deeper layers, the hot-folder monitoring unit 603 proceeds to step S1808. When the setting does not accept subfolders in deeper layers, the hot-folder monitoring unit 603 displays an error message in step S1814, and then exits the process.

When it is determined in step S807 that the setting accepts subfolders in layers deeper than specified in the hot folder, in step S1808, the hot-folder monitoring unit 603 checks whether a subfolder from which setting is to be inherited (FIG. 20) has been set by the output-information setting unit 602. More specifically, since the setting shown in FIG. 20 is stored in the RAM 202, the hot-folder monitoring unit 603 can execute the checking in step S1808 by referring to the RAM 202 (in the example shown in FIG. 20, it is dictated that the setting of the subfolder 2003 be inherited, and this information is stored in the RAM 202).

When it is determined in step S1808 that a subfolder from which setting is to be inherited has been specified, in step S1809, the hot-folder monitoring unit 603 inherits the setting of the subfolder (FIG. 20). More specifically, the hot-folder monitoring unit 603 can execute the inheritance in step S1809 by referring to the RAM 202 for print setting information stored in association with the subfolder at the specified layer.

When it is determined in step S1808 that a layer from which setting is to be inherited is not specified, in step S1810, the hot-folder monitoring unit 603 inherits the setting of a lowermost layer. Since the processing in step S1810 is equivalent to the processing in step S1809, detailed description thereof will be omitted. The processing executed in a case where a layer from which setting is to be inherited is not specified is not to step S1810, and an error message can be displayed instead.

In step S1811, the hot-folder monitoring unit 603 checks whether all the subfolders in the folder input have been checked. When it is determined in step S1811 that all the subfolders in the folder have been checked, the hot-folder monitoring unit 603 proceeds to step S812. When a subfolder yet to be checked remains, the hot-folder monitoring unit 603 returns to step S1801 to check the remaining subfolder.

In step S1812, the hot-folder monitoring unit 603 generates a job ticket for each of the subfolders input, using the print-setting information (FIG. 13) managed by the output-information setting unit 602 in association with the layer of the subfolder. More specifically, using the GUI screen shown in FIG. 19, pieces of print-setting information (output information) are stored in the RAM 202 in association with individual layers. When a folder having layers of subfolders is saved in the hot folder with the setting described above, for print data in each of the subfolders of the individual layers, print-setting information (output information) associated with the relevant layer, stored in the RAM 202, is applied to execute step S1812.

In step S1813, the print-data transmitting unit 605 transmits the plurality of pieces of print data and the job tickets generated in step S1812 together (i.e., a plurality of sets of print data and job tickets) to the printer 104 (or stores the print data in association with the job tickets.

Through the process described above, it is possible to set different print settings for subfolders in individual layers. Thus, a user can reflect different print settings for the subfolders in the individual layers simply by inputting folders having a hierarchical structure to a hot folder. This serves to improve the efficiency of user operations.

Now, a scheme of the present invention will be described.

An output-information setting unit 2201 sets output information for outputting in association with a name relating to output data saved in a hot folder. Furthermore, the output-information setting unit 2201 creates subfolders in the hot folder, and sets pieces of output information for the individual subfolders. Furthermore, the output-information setting unit 2201 sets output information for outputting in association with layers of the individual subfolders in the folder saved in the hot folder.

A monitoring unit 2202 monitors events associated with the hot folder, such as saving of a folder in the hot folder or saving of output data in a subfolder of the hot folder.

A setting-information generating unit 2203 setting information using output information set by the output-information setting unit 2201 in association with a name relating to output data when it is detected by the monitoring unit 2202 that information relating to the output data has been saved in the hot folder. Furthermore, when it is detected by the monitoring unit 2202 that output data has been saved in a subfolder of the hot folder, the setting-information generating unit generates setting information using output information set by the output-information setting unit 2201 for the output data saved in the subfolder. Furthermore, when it is detected by the monitoring unit 2202 that a folder having subfolders has been saved in the hot folder, the setting-information generating unit generates setting information using output information set by the output-information setting unit 2201 in association with layers of the subfolders.

An associating unit 2204 associates the information relating to the output data detected by the monitoring unit 2202 with the setting information generated by the setting-information generating unit 2203. Furthermore, the associating unit 2204 associates the output data in the subfolder of the folder relevant to the saving detected by the monitoring unit 2202 with the setting information generated by the setting-information generating unit 2203. Furthermore, the associating unit 2204 associates the output data in the individual subfolders of the folder relevant to the saving detected by the monitoring unit 2202 with the setting information generated by the setting-information generating unit 2203.

A specifying unit 2205 specifies a selection rule for selecting a piece of output data when a plurality of pieces of output data exist in the subfolder saved in the hot folder.

Other Exemplary Embodiments

As well as the embodiments described above, other alternative embodiments are still further provided. For instance, although hardware for implementing a network is involved in the embodiments described above, implementation based on software for executing the data processing procedures is possible. That is, it is possible to provided a system or an apparatus with a storage medium (or a recording medium) having recorded thereon program code of software for implementing the functions of the embodiments described above so that a computer (CPU or MPU) of the system or apparatus can read and execute the program code stored on the storage medium. In this case, the functions of the embodiments described above are implemented by the program code read from the storage medium. The program code can be written on various types of storage medium, such as CD, MD, memory card, or MO.

As well as implementing the functions of the embodiments by executing program code read by a computer, the functions of the embodiments can be implemented by executing actual processing in part or in entirety by an operating system (OS) or the like running on a computer according to instructions of the program code.

Furthermore, the functions of the embodiments can also be implemented by writing the program code read from the storage medium to a memory of a function extension card loaded on a computer or a function extension unit connected to a computer so that a CPU or the like of the function extension card or function extension unit executes actual processing in part or entirety.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-111284 filed Apr. 7, 2005, which is hereby incorporated by reference herein in its entirety.

What is claimed is:

1. An information processing method for an information processing apparatus having a control folder to which a plurality of pieces of output setting information are set, the information processing method comprising:

an output setting information setting step of setting pieces of output setting information that are associated with layers of individual subfolders in a folder that is inputted to the control folder;

a monitoring step of monitoring input of a folder to the control folder;

an associating step of associating the output data in the folder monitored by said monitoring step with output setting information set by said output setting information setting step based on layer information; and an output step of performing an output process using the output setting information and the output data associated by said associating step, wherein the output setting information setting step comprises a specifying step of specifying an output-setting applying rule for a case where a subfolder deeper than a predetermined depth of layer exists in a subfolder of the folder input to the control folder, and the monitoring step comprises an output-setting applying step of applying the output-setting applying rule specified in the specifying step to set output setting information that is used to output data in the subfolder deeper than the predetermined depth of layer, wherein the output-setting applying rule is used to determine whether output setting information of a subfolder in a designated layer is to be used as output setting information of the subfolder deeper than the predetermined depth of layer or saving of the subfolder deeper than the predetermined depth of layer is to be prohibited.

* * * * *